United States Patent [19]

Payne et al.

[11] Patent Number: 4,740,664
[45] Date of Patent: Apr. 26, 1988

[54] TEMPERATURE LIMITING ARRANGEMENT FOR A GLASS-CERAMIC COOKTOP APPLIANCE

[75] Inventors: Thomas R. Payne; Louis A. Welle, Jr., both of Louisville, Ky.

[73] Assignee: General Electric Company, Louisville, Ky.

[21] Appl. No.: 684

[22] Filed: Jan. 5, 1987

[51] Int. Cl.⁴ .............................................. H05B 3/74
[52] U.S. Cl. .................................... 219/449; 219/494; 219/452; 219/459
[58] Field of Search ............... 219/448, 449, 450, 451, 219/452, 453, 458, 459, 464, 492, 493, 494, 497, 463, 460

[56] References Cited

U.S. PATENT DOCUMENTS

| | | | |
|---|---|---|---|
| 3,710,076 | 1/1973 | Frazier | 219/449 |
| 3,885,128 | 5/1975 | Dills | 219/462 |
| 4,237,368 | 12/1980 | Welch | 219/449 |
| 4,394,564 | 7/1983 | Dills | 219/449 |
| 4,492,336 | 1/1985 | Takata | 219/450 |
| 4,493,980 | 1/1985 | Payne et al. | 219/450 |
| 4,493,981 | 1/1985 | Payne | 219/450 |

FOREIGN PATENT DOCUMENTS 2073455 10/1981 United Kingdom .

Primary Examiner—Clifford C. Shaw
Assistant Examiner—Teresa J. Walberg
Attorney, Agent, or Firm—H. Neil Houser; Radford M. Reams

[57] ABSTRACT

An improved power control system for a glas-ceramic cooktop appliance of the type having at least one radiant heating unit disposed beneath the glass-ceramic cooking surface, and a user actuable input keyboard to enable the user to select one of a plurality of power settings for the heating unit. The control system monitors the glass-ceramic temperature and the rate of change of the glass-ceramic temperature to detect abnormal thermal load conditions on the glass-ceramic cooking surface. Upon detection of an abnormal load condition, the power level applied to the heating unit is lowered as a function of the sensed glass-ceramic temperature, the temperature rate of change, and the user selected power setting, to limit the temperature of the glass-ceramic cooking surface so as to avoid damage by excessive temperatures resulting from the abnormal thermal load conditions on the cooking surface.

22 Claims, 13 Drawing Sheets

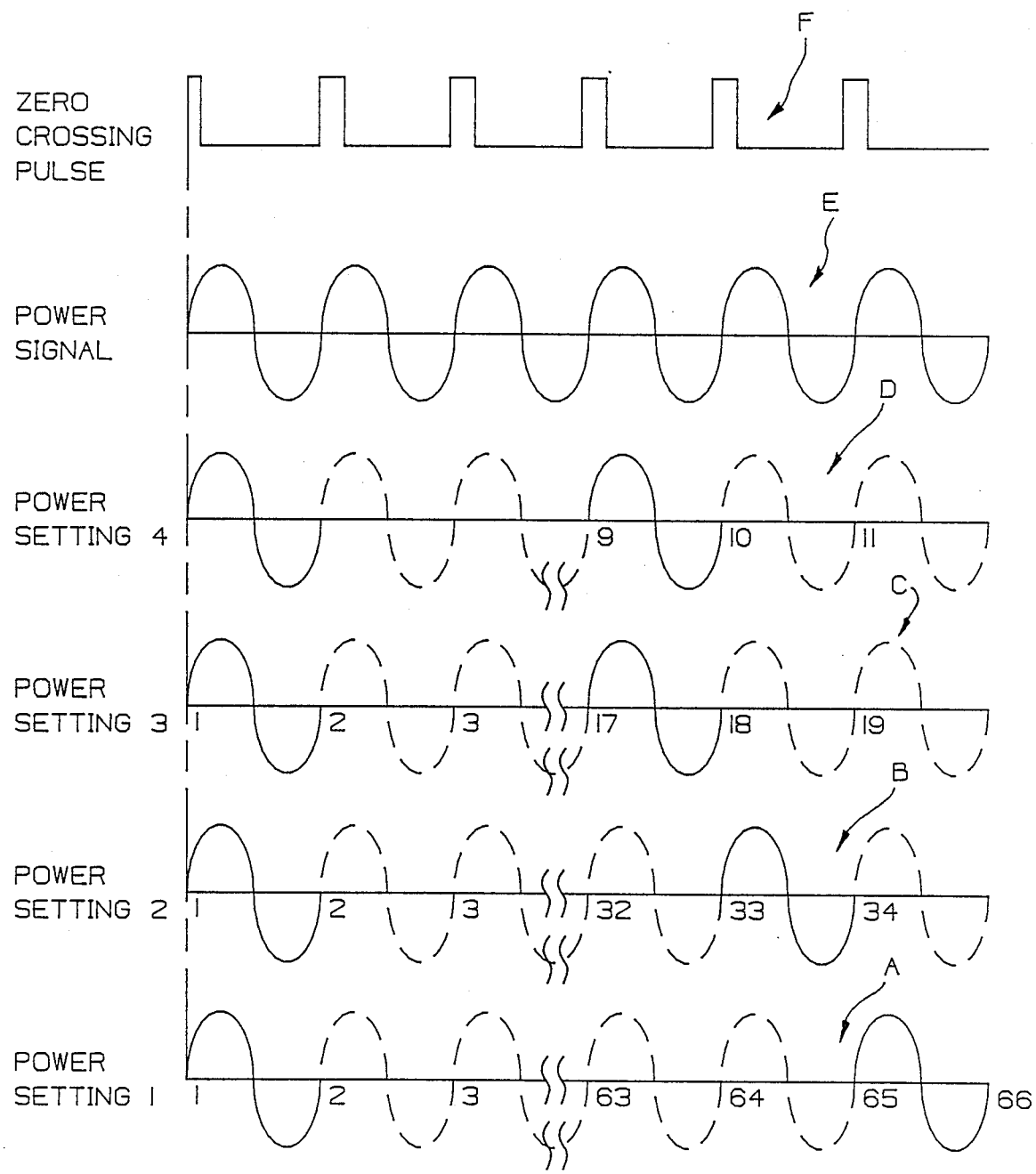

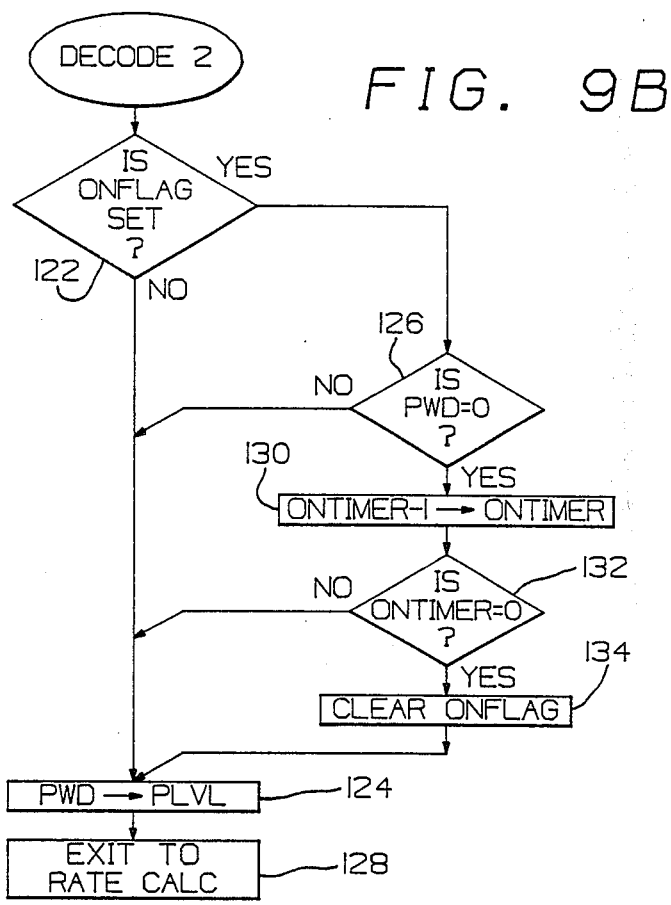

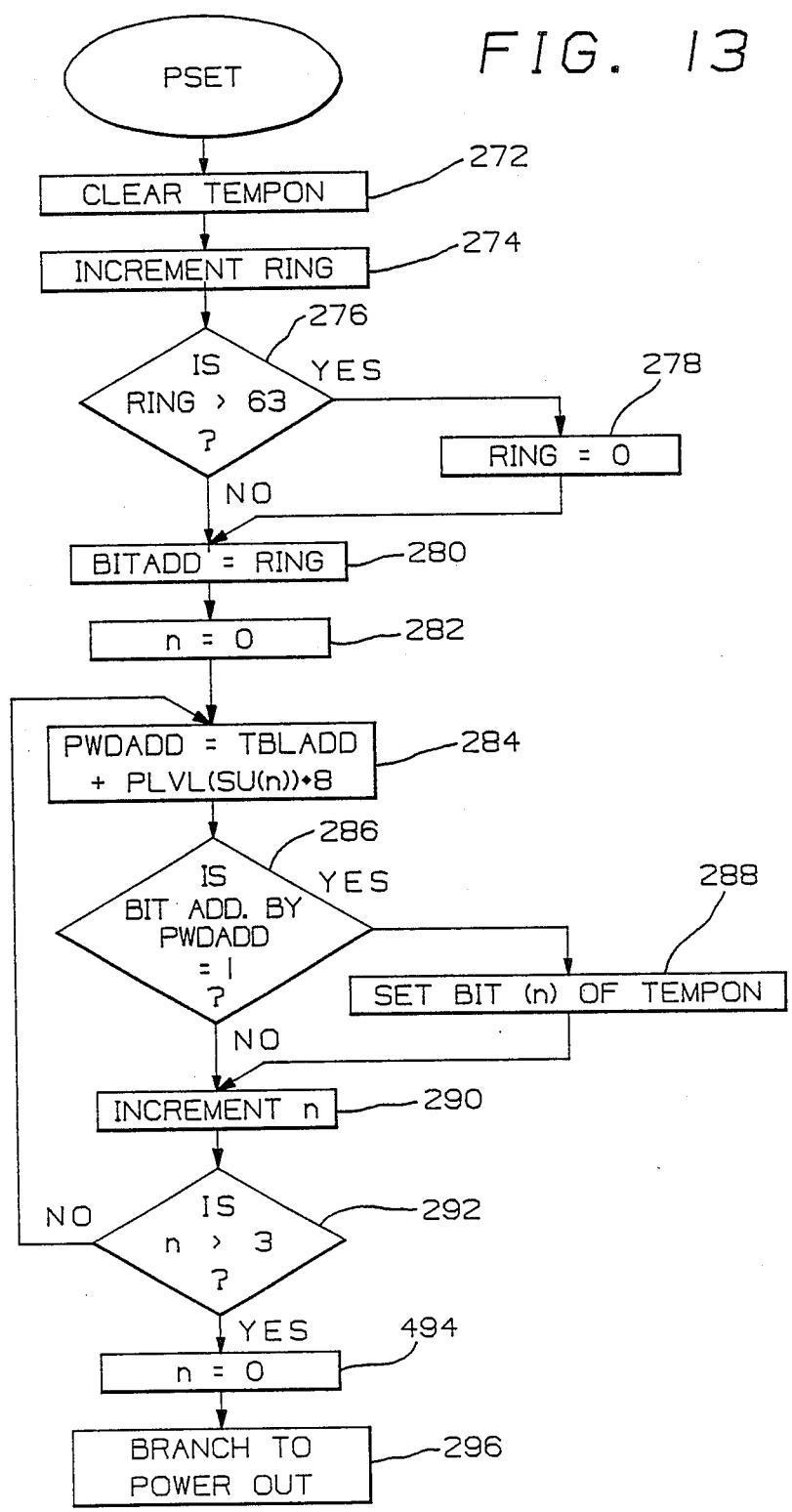

TEMPERATURE LIMITING ARRANGEMENT FOR A GLASS-CERAMIC COOKTOP APPLIANCE

BACKGROUND OF THE INVENTION

This invention relates generally to glass-ceramic cooktop appliances and particularly to electronic power control systems for such appliances which provide protection against overheating the glass-ceramic cooktop.

Use of glass-ceramic plates as cooktops is well known. Advantages of the smooth surface include pleasing appearance and easy cleanability. In conventional glass-ceramic cooktop appliances the glass-ceramic plate is heated by radiation from a heating unit such as an open coil electric resistive heater or gas burner disposed beneath the glass. The glass-ceramic is heated sufficiently to heat utensils upon it primarily by conduction from the heated glass-ceramic to the utensil. Due to the high thermal impedance of the glass-ceramic plate, such cooktops are less thermally efficient than conventional cooktops employing sheathed heating elements.

It has been found that the thermal efficiency of the glass-ceramic cooktop appliances can be significantly improved by using a heating unit which radiates substantially in the infrared region (1-3 microns) in combination with a glass-ceramic material which is transparent to such radiation. In such appliances a utensil placed on the cooktop is heated primarily by radiation transmitted directly from the heating unit to the utensil rather than by conduction from the glass-ceramic material. In addition to improved efficiency such appliances have the further advantage of responding more quickly to changes in the power level applied to the heating unit.

In both conventional glass-ceramic cooktops and radiant glass-ceramic cooktops, provision must be made to avoid overheating the cooktop. For most glass-ceramic materials the operating temperature should not exceed 700° C. for any prolonged period. Under normal operating conditions the temperature of the glass-ceramic will remain below this limit. However, conditions can occur which can cause this temperature limit to be exceeded. Commonly occurring examples include operating the heating unit with no load, i.e. no utensil, on the cooktop surface, using badly warped utensils which make uneven contact with the cooktop surface and operating the heating unit with an empty utensil.

In conventional glass-ceramic cooktop appliances thermal protection is typically provided by simply turning off the heating unit when the temperature exceeds a predetermined temperature limit. Examples of such temperature limiter arrangements can be found in commonly assigned U.S. Pat. Nos. 3,885,128 and 4,237,368. In the '128 patent a sensor is provided which responds to the temperature of a heat spreader disposed between the glass-ceramic and the heater. This sensor turns off power to the heating unit when the temperature of the heat spreader reaches 1250° F. In the '368 patent the temperature sensor utilizes the temperature resistance characteristic of the glass-ceramic plate as a means of monitoring temperature of the glass. As in the '128 patent power is simply removed from the heating unit when the sensed glass-ceramic temperature exceeds a predetermined temperature limit.

Since conventional glass-ceramic cooktops rely primarily on conduction from the glass-ceramic material to heat the load, the thermal inertia of the glass-ceramic is such that cooking performance is not significantly adversely affected by temporary interruptions in power to the heating unit. However, in cooktops which rely primarily on radiant energy from the heating unit to directly heat the utensil, shutting off power to the heating unit when the glass-ceramic material gets too hot and turning it on again when the temperature drops below a predetermined temperature presents a number of problems. For example, since the utensil is primarily heated by radiant energy from the heating unit, when the unit is turned off, the heating of the utensil drops off dramatically while waiting for the glass-ceramic to cool down. This adverse affect on cooking performance is heightened by the temperature hysteresis loop required in such temperature limiting schemes. Also, when the glass-ceramic overheats and power is removed, the heating unit cools down much more quickly than does the glass. Since radiant heating units are designed to be most efficient when operating at the highest possible temperature, the heating unit undergoes extreme temperature swings from near room temperature to operating temperature adversely affecting heating unit reliability and longevity.

In light of the foregoing limitations of the prior art there is a need for a means of limiting the temperature of the glass-ceramic plate in a glass-ceramic cooktop appliance which satisfactorily protects the glass-ceramic from overheating while minimizing any adverse affect on cooking performance and heating unit longevity.

It is therefore a primary object of the present invention to provide an improved power control system for a glass-ceramic cooktop appliance which protects the glass-ceramic from overheating without significantly adversely affecting cooking performance or heating unit longevity.

SUMMARY OF THE INVENTION

In accordance with the present invention an improved power control system is provided for a household cooking appliance of the type having a glass-ceramic cooking surface for supporting loads to be heated and at least one radiant heating unit disposed beneath the glass-ceramic cooking surface to heat loads supported thereon. User actuable input selection means enables the user to select one of a plurality of power settings for the heating unit. The power control system includes temperature sensing means for sensing the temperature of the glass-ceramic cooking surface proximate the heating unit and power control means operative to normally operate the heating unit at a power level corresponding to the user selected power setting. The power control means is responsive to the input selection means and the temperature sensing means; and includes means for determining the rate of change of the sensed glass-ceramic temperature and means for monitoring the glass-ceramic temperature and the temperature rate of change to detect an abnormal thermal load condition on the glass-ceramic cooking surface. Upon detection of an abnormal load condition, the power control means operates the heating unit at a power level lower than the power level associated with the selected power setting, how much lower being determined as a function of the sensed glass-ceramic temperature, the temperature rate of change, and the user selected power setting, to limit the temperature of the glass-ceramic cooking surface so as to avoid damage by excessive temperatures resulting from the abnormal thermal load conditions on the cooking surface.

In accordance with one aspect of the present invention the means for monitoring the glass-ceramic temperature and the temperature rate of change to detect an abnormal load condition comprises means for comparing the sensed glass-ceramic temperature to a predetermined threshold reference temperature and means for comparing the measured temperature rate of change to a predetermined reference rate of change representative of an abnormal load condition on the glass-ceramic cooking surface. The monitoring means detects an abnormal load condition when the sensed temperature exceeds the referenced temperature and the measured temperature rate of change exceeds the reference rate of change.

In accordance with another aspect of the present invention the means for monitoring the sensed temperature and rate of change of temperature to detect an abnormal load condition comprises means for comparing the sensed glass-ceramic temperature to a first predetermined reference temperature representative of an abnormally high temperature condition and means for comparing the rate of change to a predetermined negative reference rate of change. An abnormal load condition is detected when the sensed temperature exceeds the reference temperature and the measured rate of change is less negative than the reference rate of change. By this arrangement the power control system operates the heating unit at successively lower power levels until the glass-ceramic temperature becomes less than the reference or the measured rate of change of glass-ceramic temperature signifying that the temperature is decreasing more rapidly than the negative reference rate. In accordance with this aspect of the invention the power control means is further operative following the reduction of the power level applied to the heating unit to a level lower than the user selected level in response to the detection of an abnormal load condition, and after such a condition ceases to be detected, to gradually increase the power level applied to the heating unit until the applied power level again equals the user selected power level or until detection of an abnormal load condition recurs. By this arrangement the system establishes a quiescent operating point which keeps the glass-ceramic temperature below the reference temperature while operating the heating unit at a power level as close to the user selected level as possible consistent with temperature limits.

By combining the two foregoing aspects of the present invention into a single system, the system is operative when the glass-ceramic is heating up, to lower the applied power level when the temperature rate of change indicates the existence of an abnormal load condition characterized by an undesirably rapid increase in temperature, and to lower the applied power level if the temperature of the glass-ceramic reaches an undesirably high temperature without an undesirably rapid increase and is not decreasing at a satisfactory rate.

While the novel features of the invention are set forth with particularity in the appended claims, the invention both as to organization and content will be better understood and appreciated from the following detailed description taken in conjunction with the drawings.

BRIEF DESCRIPTION OF THE DRAWINGS

FIG. 5 illustrates power signals corresponding to various operator selectable power settings and a timing signal for sychronizing control system operation with the power signal;

FIGS. 9A and 9B are flow diagrams of the Keyboard Decode routine incorporated in the control program for the microprocessor in the circuit of FIG. 7;

FIG. 13 is a flow diagram of the PSET routine incorporated in the control program of the microprocessor in the circuit of FIG. 7.

DETAILED DESCRIPTION OF THE ILLUSTRATIVE EMBODIMENT

Figure 1:
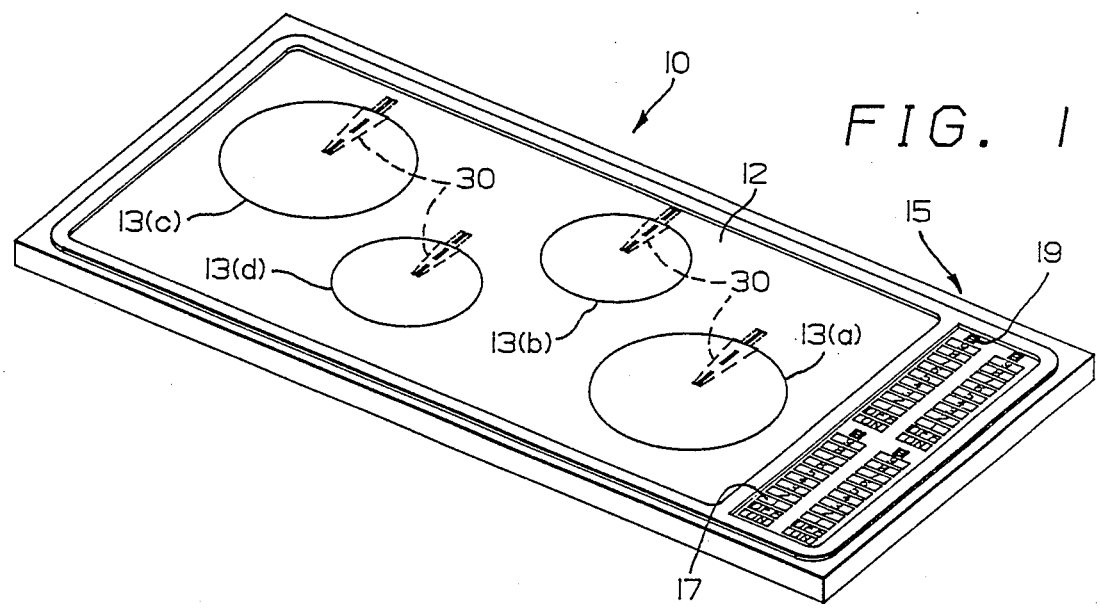
FIG. 1 is a front perspective view of a portion of a cooktop illustratively embodying the power control system of the present invention.

FIG. 1 illustrates a glass-ceramic cooktop appliance designated generally 10. Cooktop appliance 10 has a generally planar glass-ceramic cooking surface 12. Circular patterns 14 identify the relative lateral positions of each of four heating units (not shown) located directly underneath surface 12. A control and display panel generally designated 15 includes a complete set of touch control keys 17 and a seven-segment digital LED display element 19 for each heating unit.

The term glass-ceramic with reference to the material comprising cooktop surface 12 refers to a boron silicate material in the Ceran family of materials. In particular in the illustrative embodiment the glass-ceramic material is an infrared transmissive glass-ceramic material designated Ceran-85 manufactured by Schott, Incorporated.

Figure 2:
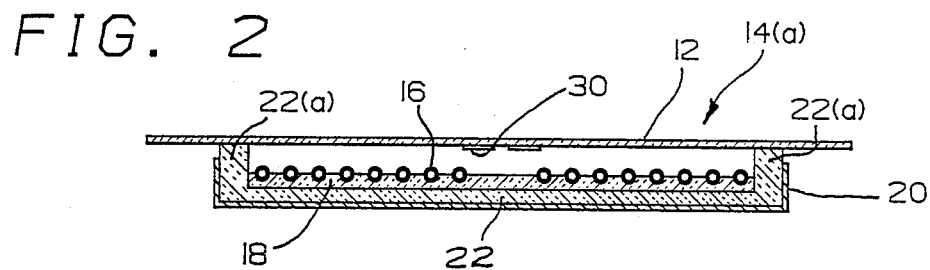
FIG. 2 is a sectional side view of a portion of the cooktop of FIG. 1 showing details of one of the heating units.
Figure 3:
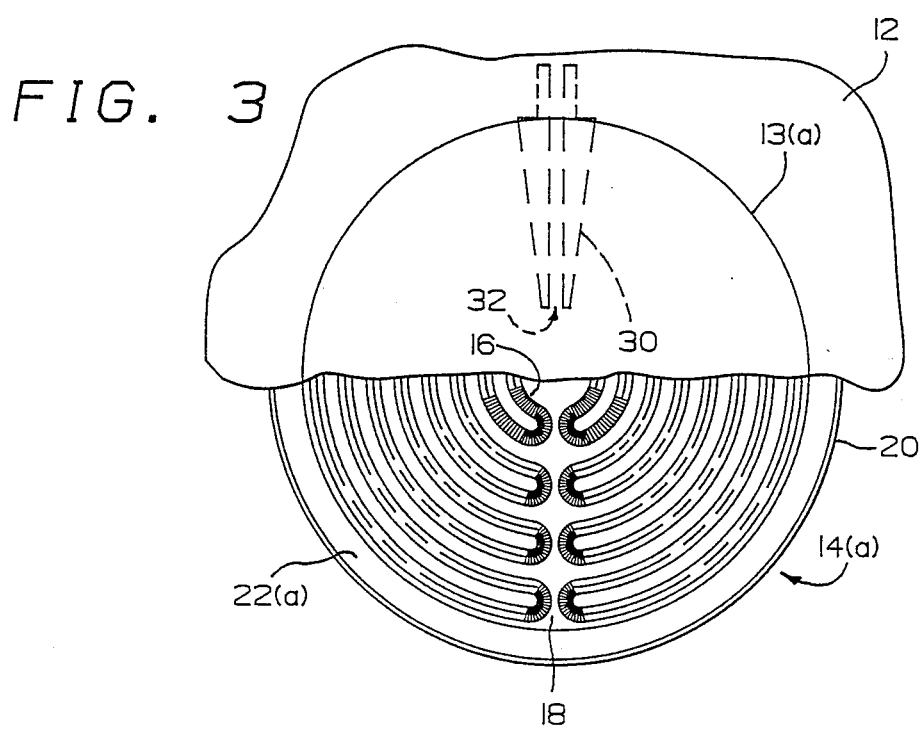
FIG. 3 is an enlarged top view of a portion of the cooktop of FIG. 1 showing details of the temperature sensor and the heating unit.

A heating unit is disposed beneath each of the circular patterns 13(a)–13(d). In the discussion to follow the designators 14(a)–14(d) shall be understood to refer to the heating unit disposed under patterns 13(a)–13(d)

respectively. Surface unit 14(a) is shown in greater detail in FIGS. 2 and 3. For purposes of illustration only one of the heating units is shown. It will be understood that heating units 14(b)-14(d) are similar in structure to that shown in FIGS. 2 and 3. Heating units 14(a) and 14(c) are 8 inches in diameter. Units 14(b) and 14(d) are 6 inches in diameter.

Referring again to FIGS. 2 and 3, heating unit 14(a) comprises an open coil electrical resistance element 16 of spiral configuration, which is designed when fully energized to radiate primarily in the infrared (1-3 micron) region of the electromagnetic energy spectrum. Element 16 is arranged in a concentric coil pattern and staked or otherwise secured to a support disk 18 foraed of Micropore material such as is available from Ceramaspeed under the name Microtherm. Disk 18 is supported in a sheet metal support pan 20, by an insulating liner 22 formed of an aluminum oxide, silicon oxide composition. This insulating liner 22 includes an annular upwardly extending portion 22(a) which serves as an insulating spacer between base 18 and the glass-ceramic cooktop 12. When fully assembled, pan 20 is spring loaded upwardly forcing the annular portion 22(a) of insulating liner 22 into abutting engagement with the underside of cooktop 12 by support means not shown. Heating units 14(a)-14(d) are manufactured and sold commercially by Ceramaspeed under the part name Fast Start Radiant Heater with Concentric Coil Pattern.

Figure 4:
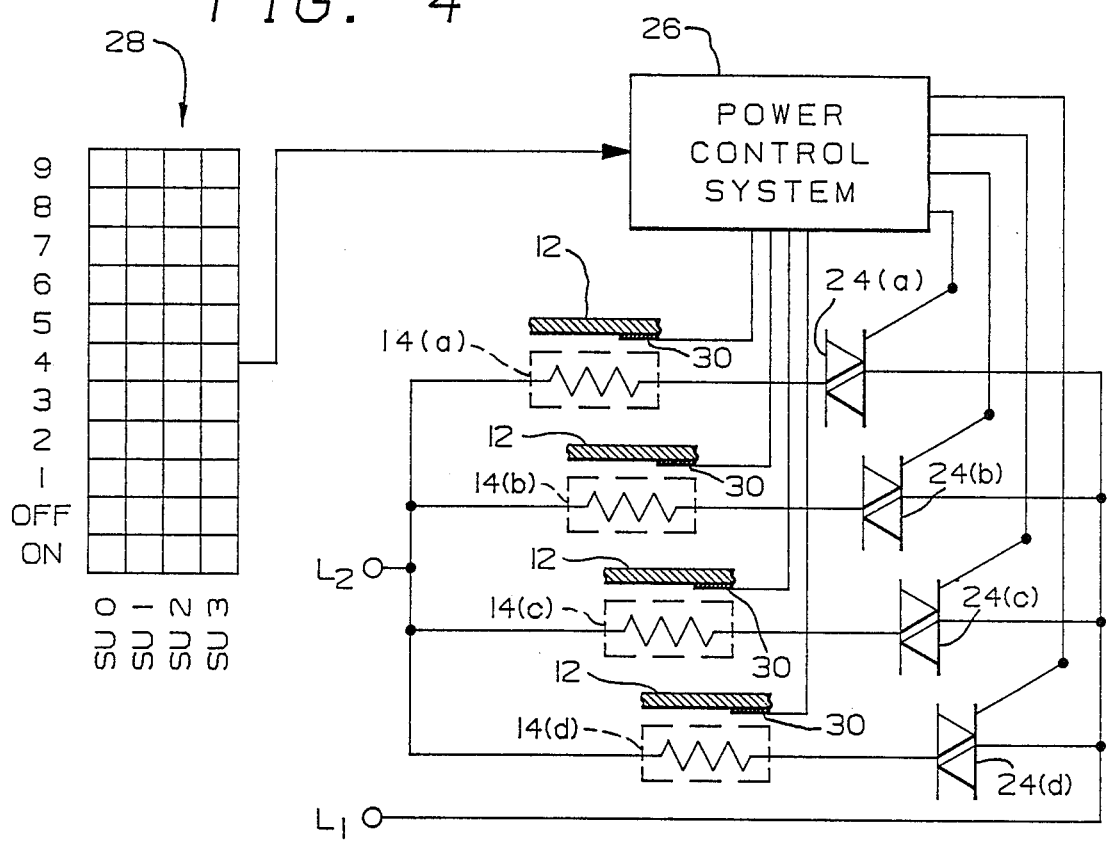
FIG. 4 is a functional block diagram of the power control circuitry for the cooktop of FIG. 1.

FIG. 4 illustrates in simplified schematic form an embodiment of a system to be controlled in accordance with the present invention. Each of four heating units 14(a)-14(d) is coupled to a standard 240 volt, 60 Hz AC power source via power lines L1 and L2 through one of four triacs 24(a)-24(d) respectively, the heating circuits being connected in parallel arrangement with each other. Triacs 24(a)-24(d) are conventional thyristors capable of conducting current in either direction irrespective of the voltage polarity across their main terminals when triggered by either a positive or negative voltage applied to the gate terminals.

The power control system 26 controls the power applied to the heating units by controlling the rate at which gate pulses are applied to the triac gate terminals in accordance with power setting selections for each heating unit entered by user actuation of tactile touch membrane switch keyboard 28. The columns of keys designated SU0 through SU3 provide the control inputs for heating units 14(a)-14(d) respectively. In the illustrative embodiment power pulses applied to the heating units are full cycles of the 240 volt, 60 Hz AC power signal; however, power signals of different frequencies and voltage levels such as 120 volts could be similarly used.

A plurality of discrete power settings are provided, each having uniquely associated with it a particular power pulse repetition rate. In the illustrative embodiment nine power settings plus Off and On are selectable for each heating unit by user actuation of the keys in keyboard 28. Table I shows the pulse repetition rate associated with each power setting.

TABLE I

| Power Settings | Power Level | Power Pulse Repetition Rate | Look Up Table | | | | |
|---|---|---|---|---|---|---|---|
| | | | Address | Power Pulse Code | | | |
| OFF | 0 | — | TBLADDR | 0000 | 0000 | 0000 | 0000 |
| ON | 0 | — | TBLADDR | 0000 | 0000 | 0000 | 0000 |
| 1 | 1 | 1/64 | TBLADDR +8 | 8000 | 0000 | 0000 | 0000 |
| 2 | 2 | 1/32 | TBLADDR +10 | 8000 | 0000 | 8000 | 0000 |
| 3 | 3 | 1/8 | TBLADDR +18 | 8000 | 8000 | 8000 | 8000 |
| 4 | 4 | 1/4 | TBLADDR +20 | 8080 | 8080 | 8080 | 8080 |
| 5 | 5 | 10/64 | TBLADDR +28 | 8088 | 8080 | 8088 | 8080 |
| 6 | 6 | 15/64 | TBLADDR +30 | 8888 | 8888 | 8888 | 8880 |
| 7 | 7 | 21/64 | TBLADDR +38 | AA88 | A888 | A888 | A888 |
| 8 | 8 | 28/64 | TBLADDR +40 | AA8A | AA8A | AA8A | AABA |
| 9 | 9 | 36/64 | TBLADDR +48 | EAAA | EAAA | EAAA | EAAA |
| A | | 41/64 | TBLADDR +50 | EEEE | EAEA | EAEA | EAEA |
| B | | 45/64 | TBLADDR +58 | EEEE | AEEE | EAEE | EEAE |
| C | | 51/64 | TBLADDR +60 | FEEE | EEEE | FEEE | FEEE |
| D | | 55/64 | TBLADDR +68 | FEFE | FEFE | FEFE | FEEE |
| E | | 59/64 | TBLADDR +70 | FFEF | FEFF | EFFE | FFEF |
| F | | 64/64 | TBLADDR +78 | FFFF | FFFF | FFFF | FFFF |

The power pulse code in Table I represents 64-bit control words in hexadecimal format. The distribution of ON power cycles over a 64 cycle control period for each power setting is defined by the bit pattern of the associated control word. On and OFF cycles are represented by logical one and logical zero bits respectively. These repetition rates have been empirically established to provide a range of power settings for good cooking performance in the appliance of the illustrative embodiment. The bit patterns have been selected to minimize the duration of idle or OFF cycles for each power level.

In FIG. 5 waveforms A-D represent the voltage applied to heating element for each of power settings 1 through 4 respectively. Wave form E represents the power signal appearing across lines L1 and L2. Power pulses or ON cycles are represented by full lines. Those cycles of the power signal during which the triac is non-conductive are shown in phantom lines. As shown in Table I and FIG. 5, the pulse repetition rate for the first four power settings range from 1 pulse per 64 power cycles for power setting 1, the lowest non-Off power setting to 1 power pulse for every 8 cycles for power level 4.

The maximum user selectable power setting, level 9, corresponds to a repetition rate of 36 cycles per 64 cycles. The additional 6 available power settings are reserved for use in a control arrangement for overdriving the unit to rapidly bring it up to temperature and to permit the heating unit to be designed for steady state operation at an effective voltage which is lower than the 240 volt line voltage as is described in greater detail in commonly assigned co-pending patent application Ser. No. 000,426 to Thomas R. Payne, filed Jan. 5, 1987 the disclosure of which is hereby incorporated by reference.

It is important to limit the operating temperature of the glass-ceramic plate 12 to avoid damage to the plate due to overheating. A temperature sensor for this purpose is provided in the illustrative embodiment in the form of four pairs of precious metal strips 30 foraed on the underside of glass-ceramic plate 12. One pair is associated with each heating unit. Strips 30 serve as electrical contacts and the glass-ceramic material in the gap 32 between the strips is a resistance, the value of which varies as a function of the temperature of the glass. Strips 30 may be silk screened and fired onto the underside of the glass-ceramic cooktop 12 at a temperature of about 1300° F. Strips 30 are built up to a thickness of about 50 to 100 angstroms and extend from outside the edge of each of the circular pattern 13(a-)-13(d) nearly to the center of the pattern. The strips are spaced apart a distance of 0.3 inches. The length of each strip is 2½ inches and 3½ inches for the 6" and 8" heating units respectively. The minimum width of each strip is 0.1 inches. Such a construction gives a finite measurable resistance value for each strip conductor. The resistance of the strips is not critical, but a value in the range of 1-10 ohms is preferred. Gold is used in the illustrative embodiment to form the strips 30; however, it will be appreciated that other precious metals and combinations thereof such as gold palladium combinations or the like could be similarly employed. The particular tapered pattern for strips 30 in the illustrative embodiment was selected somewhat arbitrarily for enhanced appearance since the strips will be visible through the cooktop when the heating units are operating and is not essential for proper operation.

Figure 6:
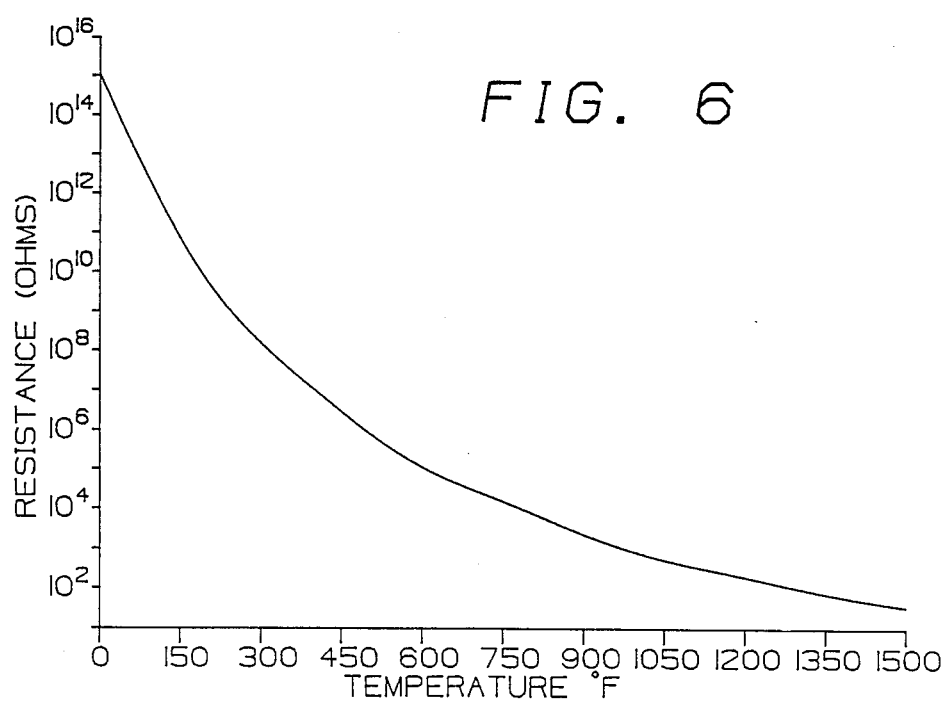
FIG. 6 is a graphic representation of the resistance vs. temperature characteristic for the glass-ceramic material forming the surface of the cooktop of FIG. 1.

The resistance between strips 30 is a function of the distance between the strips, the length, glass-ceramic thickness, cooktop material as well as the temperature. The temperature vs. resistance characteristic of the glass-ceramic material comprising the temperature sensor of the illustrative embodiment is graphically represented in FIG. 6. At the maximum temperature of 1300° F. (700° C.) the resistance of the glass-ceramic is approximately 200 ohms. At room temperature the resistance of the glass-ceramic is in the megaohm range.

For most glass-ceramic materials the temperature of the material should not be substantially above approximately 700° C. for prolonged periods of time. However, such materials can generally withstand temperatures above this level for short times. The time period varies inversely with temperature. While 700° C. is representative of a variety of glass-ceramic materials applicable for cooktops, the specific parameters for the particular materials may vary somewhat. The temperature vs. time envelope for the particular glass-ceramic material employed in the cooktop of the illustrative embodiment is defined in Table II. The time values are cumulative over the lifetime of the material.

TABLE II

Ceran-85 Maximum Operating Temperature-Time Envelope

| Temperature | Time |
|---|---|
| 600° C. | 6000 hours |
| 650° C. | 750 hours |
| 675° C. | 250 hours |
| 700° C. | 100 hours |
| 725° C. | 35 hours |

From Table II it is apparent that temperatures below approximately 600° C. can be tolerated indefinitely whereas temperatures above 725° C. can only be tolerated for a relatively few hours over the lifetime of the glass-ceramic material.

As hereinbefore briely described, the main heat transfer mechanism in the cooktop of the illustrative embodiment is radiation from the heating unit to the utensil through the glass. The glass-ceramic is substantially transparent to infrared radiation; however, not totally so. Thus, a portion of the energy radiating from the heating unit is absorbed by the glass-ceramic. Similarly, a portion of the energy reflected from the utensil is also absorbed by the glass-ceramic. Heat transfer from the glass-ceramic is primarily by conduction to the utensil. Flat bottom utensils making good contact with the cooktop surface provide good heat transfer. When such utensils are used, the glass-ceramic temperature will usually remain within acceptable limits without need for any corrective action.

However, excessive glass-ceramic temperatures in the cooktop can occur as a result of heating abnormal loads which do not provide adequate heat transfer from the glass-ceramic. Commonly occuring abnormal load conditions likely to cause excessive heating can be grouped into one of three general categories, designated for purposes of this description as no-load, warped pan and boil dry.

No-load refers to the condition in which the heating unit is operating with no utensil present, such as may occur when the user removes the utensil from the cooktop and forgets to turn off the unit, or the user places a utensil over one unit and inadvertently turns on a different unit. Since no utensil is present to conduct heat away from the glass-ceramic under such conditions, at a sufficiently high power setting the glass-ceramic eventually can become overheated. However, since a substantial portion of the radiant energy from the heating unit is transmitted through the glass, the maximum temperature is less than that associated with the other two categories of abnormal loads.

The "warped pan" category refers to the use of utensils having a bottom surface which is warped and thus provides poor contact with the cooktop surface, resulting in poor heat transfer from the glass. In addition, the pan reflects energy back toward the glass. The cumulative effect of poor contact and reflection results in more severe overheating than that associated with no-load condition.

The Boil Dry category, which is the most extreme abnormal condition, refers to the heating of an empty utensil, such as typically may result from the evaporation of the contents of the utensil. Empty utensils have no contents to absorb heat from the utensil. Such utensils can become extremely hot. The hot utensil then heats the glass-ceramic by both conduction and reflected radiation.

It will be recalled that an object of the present invention is to protect against overheating of the cooktop glass-ceramic without adversely affecting cooking performance. To that end, in accordance with one aspect of the invention, the power control system uses glass-ceramic temperature information to anticipate the occurrence of an over-temperature condition by detecting the presence of an abnormal load on the cooktop and adjusting the power level applied to the heating unit before the temperature exceeds acceptable limits. By anticipating the condition before it actually exists, power level adjustments can be made gradually, having less affect on cooking performance.

It has been empirically determined that when common abnormal load conditions of the type outlined above are heated on the glass-ceramic cooktop of the illustrative embodiment with the cooking surface at or near room temperature, the glass-ceramic temperature increases at a rate higher than the maximum rate characteristic of most normal loads. Advantageous use is made of this phenomenon in the control system of the present invention by measuring the rate of change of temperature of the glass-ceramic and comparing this rate to a predetermined reference rate characteristic of an abnormal load condition. When the measured rate exceeds the reference rate, signifying the presence of an abnormal load condition on the cooktop, power to the heating unit is reduced to a lower level. As will be hereinafter described in greater detail, the lower level is established as a function of the measured rate of temperature change, the sensed glass-ceramic temperature and user selected power settings so as to reduce the rate of change to a rate less than the reference. By this arrangement the temperature of the glass-ceramic is limited so as to avoid destructive overheating.

Since it is desirable to heat up loads quickly at low temperatures for efficient cooking, it is unnecessary and may be undesirable to reduce the power level applied to the heating unit until at least a minimum temperature is reached. If a low power setting is selected, the glass-ceramic temperature may asymptote out at an acceptable temperature level even with an abnormal load, making adjustments unnecessary. Also, the load may be subsequently adjusted by the user such as by adding to the contents of the utensil. Thus, the rate of increase of glass-ceramic temperature is not used to detect an abnormal load condition until after at least a minimum reference temperature has been reached.

A series of tests were conducted using the cooktop of the illustrative embodiment with a variety of different loads to generate temperature vs. time curves characterizing the various different loads. From these curves a characteristic reference rate was established for each of the three typical abnormal load conditions outlined above. Satisfactory results have been achieved in the illustrative eabodiment using the reference rates of 1.3° C./sec, 0.8° C./sec and 0.4° C./sec for the No Load, Warped Pan and Boil Dry conditions respectively.

Also in the illustrative embodiment, satisfactory results have been achieved using three threshold reference temperatures, one for each reference rate of change. The values for the reference temperatures are 400° C., 440° C. and 480° C. for the No-Load, Warped Pan and Boil Dry conditions respectively. The reference temperatures are selected with a view to allowing for corrections early enough to prevent overheating with the least possible reduction in power level but late enough to avoid unnecessary adjustments. The values for the reference rates and reference temperatures have been empirically determined to provide good results with the appliance of the illustrative eabodiment, but it is to be understood that they are intended to illustrate but not limit the invention.

The power control system uses the temperature and rate of change of temperature information to detect abnormal load conditions under the following circumstances:

(a) a sensed glass-ceramic temperature greater than the minimum reference temperature and a measured rate of change of glass-ceramic temperature greater than the maximum reference rate;

(b) a sensed glass-ceramic temperature greater than the intermediate reference temperature and a measured rate of change greater than the warped pan reference rate; or (c) a sensed temperature greater than the maximum reference temperature and a measured rate of change greater than the no-load reference rate.

When an abnormal load condition is detected, the power applied to the heating unit is reduced as a function of the selected power level for the heating unit, the sensed glass-ceramic temperature, and the measured rate of change of the glass-ceramic temperature.

In the illustrative embodiment when the power control system determines that the temperature exceeds the maximum reference temperature, the power applied to the heating unit is cycled back three power levels below the user selected power level when the maximum reference rate (boil dry) is exceeded, two levels when the measured rate of temperature change is greater than the warped pan rate but less than the boil dry rate, and one power level, if only the minimum (no load) reference rate is exceeded. When the sensed glass-ceramic temperature is greater than the intermediate reference temperature but less than the maximum reference temperature, less corrective action is required since the glass-ceramic temperature is not as high; power is cycled back two levels when the boil dry slope is exceeded and one level when the no-load reference rate is exceeded. When the temperature is greater than the minimum reference temperature, but less than the intermediate reference temperature, the least corrective action is required; the power level is reduced by one power level when the rate of change temperature exceeds the boil dry reference rate.

While the system hereinbefore described prevents overheating of the glass-ceramic under many operating conditions, it is possible for a load to heat up to an undesirably high temperature so slowly that the rate of change never exceeds any of the reference rates. Under such circumstances no abnormal operating condition is detected by the rate control portion of the power control system. Also, even when an abnormal load is detected and the power is reduced accordingly, if the load remains on the cooktop long enough, the temperature may eventually asymptote out at an undesirably high temperature.

As a safeguard against such occurrences the rate control portion of the system is complemented by a steady state control portion. The steady state control portion comprises two parts. The first part tends to limit increases in glass-ceramic temperature by comparing the sensed glass-ceramic temperature to a series of five ascending predetermined reference temperatures, the lowest of which being higher than the maximum acceptable steady state temperature. The power level applied to the heating unit is reduced by an additional level for each reference temperature that is exceeded. For example, when the minimum reference is exceeded, the power level is reduced by one level; when the maximum reference is exceeded the power level is reduced by five power levels.

This first part of the steady state portion of the control system tends to prevent the glass-ceramic temperature from remaining for any prolonged period above the higher reference values by drastically reducing the power level if necessary. However, this will not always prevent the glass-ceramic from staying at a steady state temperature level which is higher than the minimum reference temperature.

The second part of the steadY state control is designed to gradually force the glass-ceramic temperature to a steady state level which is within the acceptable temperature limits.

When load conditions are such that the glass-ceramic will overheat when operated at the level corresponding to the user selected power setting, the second portion of the steady state routine seeks to rapidly establish a quiescent operating point for the heating unit at the maximum power level consistent with maintaining the glass-ceramic temperature within an acceptable temperature band. To this end, the second portion of the steady state control monitors the rate of decrease of temperature whenever the glass-ceramic temperature is above a maximum reference temperature and adjusts the power level applied to the heating unit to establish a decreasing temperature rate for the glass-ceramic which will bring the glass-ceramic temperature within acceptable limits within an acceptable time period. When the measured glass-ceramic temperature exceeds the maximum acceptable steady state temperature reference, the rate of change of glass-ceramic temperature is determined and compared to a predetermined negative reference rate corresponding to the minimum acceptable rate of decrease of glass-ceramic temperature. If the measured rate of change is more negative than this reference rate, signifying that the glass-ceramic temperature is decreasing at an acceptable rate which will bring it within the acceptable temperature limits within an acceptable time period, no further adjustment to the power level is required. However, if the rate of change is not more negative than the reference rate, the power level applied to the surface heating unit is periodically successively reduced until either the rate is sufficiently negative or the temperature has declined to within acceptable limits.

Once either the temperature is brought within acceptable limits or the rate is sufficiently negative, the power level is then successively increased until the power level returns to the user selected power level or until detection of an abnormal load condition recurs. By this arrangement a quiescent operating point is reached at which the heating unit is operating as close as possible to the selected power setting without exceeding the temperature restraints, thereby limiting the glass-ceramic temperature to within acceptable limits with minimum adverse affect on the cooking performance.

In measuring the negative rate of change two different time intervals between successive rate computations are employed. A first longer interval is employed when the temperature is greater than a second reference temperature slightly less than the maximum reference temperature and a shorter interval is employed when the sensed temperature is less than this second reference. The shorter time interval is employed when the sensed temperature is less than this second reference temperature in order to establish the quiescent point quickly and minimize the amount of time that the unit is operated at a lower power level than necessary to meet the temperature constraints.

In view of the time-temperature envelope for the glass-ceramic material described in Table II and in order to provide a safety margin, in the illustrative eabodiment the control system is designed to force the glass-ceramic temperatures within the 520°-540° C. temperature band when load conditions preclude operating at the user selected power setting.

This second portion of the steady state control provides protection against overheating for those conditions which might not be detected by the rate control portion of the control system. In addition, the second portion would prevent overheating resulting from conditions which are adequately detected by the rate control portion of the control system. Thus, this portion of the control could act as a stand alone temperature limiting system. However, by anticipating excessive temperature situations by detecting abnormal loads before the temperature rises to an unacceptably high level, correction can be made with less adverse affect on cooking performance. Thus, overall performance is enhanced by combining the rate control with the second portion of the steady state control. Under most conditions giving rise to abnormal loads corrective action will be taken by either the rate control portion or the second portion of the steady state control before the first portion of the steady state control ever cores into play. Thus, the first portion of the steady state control serves primarily as a fail safe backup to insure that extreme temperature conditions cannot exist for an unacceptably long period of time.

Figure 7:
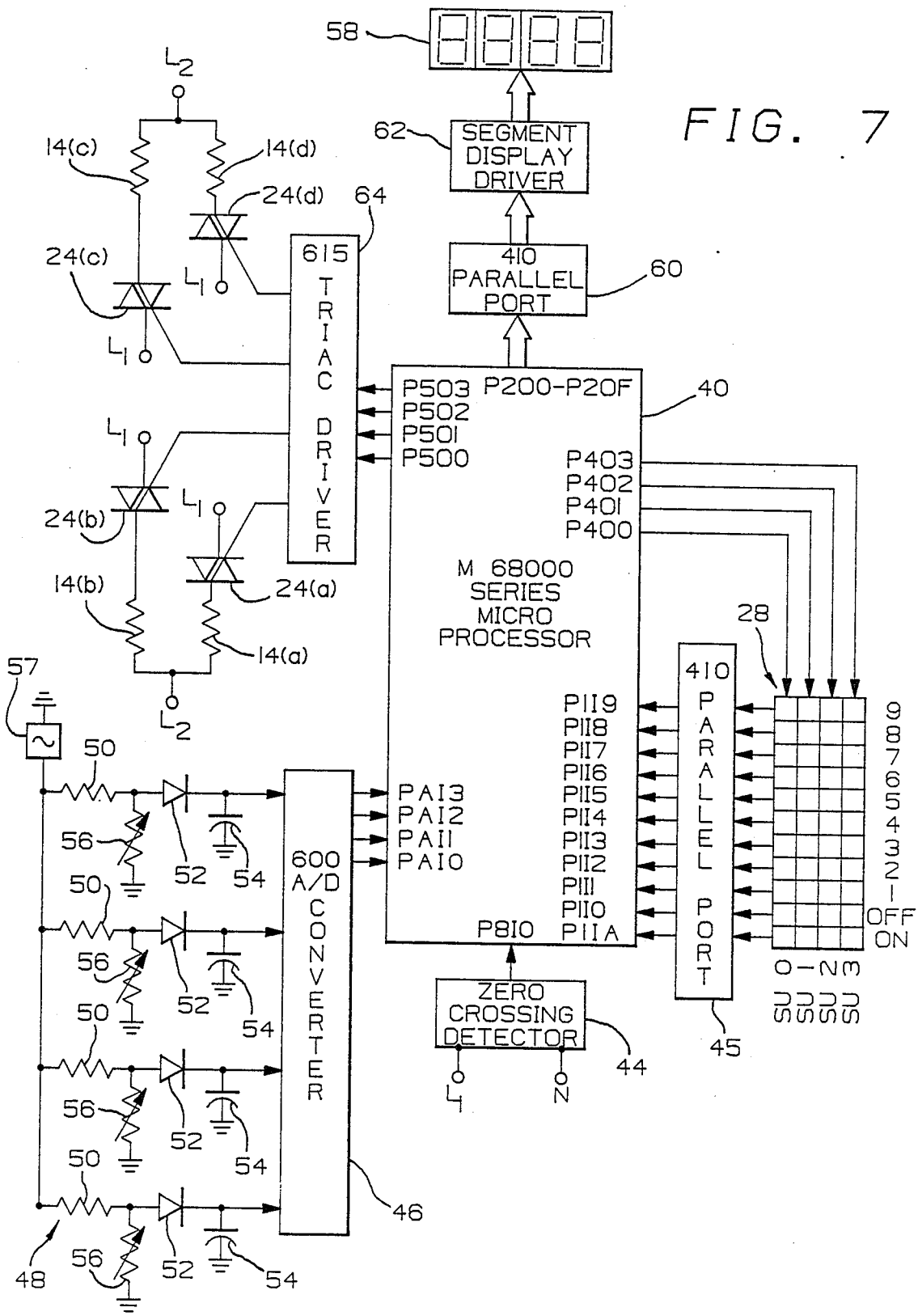
FIG. 7 is a simplified schematic diagram of a control circuit illustratively embodying the power control system of the present invention as embodied in the cooktop of FIG. 1.

FIG. 7 schematically illustrates an embodiment of a power control circuit for the cooktop of FIG. 1 which performs the temperature limiting function in accordance with the present invention. In this control system power control is provided electronically by microprocessor 40. Microprocessor 40 is a M68000 series microprocessor of the type commercially available from Motorola. Microprocessor 40 has been customized by permanently configuring its read only memory to implement the control scheme of the present invention.

As previously described with reference to FIG. 4, keyboard 28 is a conventional tactile touch type entry system. The keyboard array comprises four columns of 11 keys each. Columns for controlling heating elements are designated SU0 through SU3 respectively. The keys enable a user to select power levels 1 through 9 in addition to On and Off for each of the four heating units. Keyboard 28 has one input line for each column commonly shared by all keys in that column and 11 output lines, one for each row of keys. Each particular column of keyboard 28 is scanned by periodically generating scan pulse sequentially at outputs P400 through P403 of microprocessor 40. These pulses are transmitted as they appear to the corresponding column input lines of keyboard 28. This voltage is transmitted essentially unchanged to the output lines of all the untouched keys. The output of an actuated key will differ, signifying actuation of the key in that row and column.

In this manner each column of keyboard 28 is scanned for a new input periodically at a rate determined by the control program stored in the ROM of microprocessor 40. As will become apparent from the description of the control routines which follow, each column is scanned once every four complete power cycles of the power signal appearing on lines L1 and N. The output from keyboard 28 is coupled to input ports P1IO-P1IA of microprocessor 40 via a 410 parallel port interface circuit.

A zero crossing signal marking zero crossings of the power signal appearing on lines L1 and N from the power supply is input to microprocessor 40 at input port P810 from a conventional zero crossing detector circuit 44. The zero crossing signal from circuit 44 is illustrated at wave form F of FIG. 5. The pulses mark the position going zero crossings of the power signal across lines L1 and N of the AC power supply. The zero crossing signals are used to synchronize the triggering of the triacs with zero crossings of the power signal and for timing purposes in the control program executed by microprocessor 40.

Glass cooktop temperature information is provided to microprocessor 40 at input ports PAIO through PA13 via a standard VME 600 A-D converter circuit 46. An analog voltage signal representative of the temperature of the glass-ceramic in the vicinity of each heating unit is provided via temperature sensor voltage bridge network 48 comprising for each heating unit, a current limiting 2KΩ resistor 50, an isolating diode 52, and a 10 μf filter capacitor 54. The resistance of the glass-ceramic is represented schematically as variable resistor 56 coupled between the junction of the current limiting resistor 50 and diode 52 and ground. The other side of the current limiting resistor is coupled to an AC supply source 58. AC supply 58 is used to drive the glass-ceramic sensor resistance circuitry in order to minimize capacitance and diffusion affects. The analog voltage signal applied to the input of the A-D converter from each individual sensor circuit is converted internally to a digitized value which is stored in the RAM of microprocessor 40.

Microprocessor 40 transmits triac trigger signals from I/O ports P500 through P503 to the gate terminals of traics 24(a)-24(d) respectively via a conventional 615 triac driver circuit. Triac driver circuit 64 amplifies the outputs from ports P500-P503 of microprocessor 40 and isolates the chip from the power line. Display data is transmitted from I/O ports P200-P20F. Display 58 is a conventional four digit display, each digit comprising a 7-segment LED display. Display information is coupled from I/O ports P200-P20F to the display segments via a conventional 410 parallel port interface circuit 60 and a conventional segment display decoder driver circuit 62 in a manner well known in the art.

It will be recalled that microprocessor 40 is customized to perform the control functions of this invention by permanently configuring the ROM to implement a predetermined set of instructions. FIGS. 8-14 are flow diagrams which illustrate the control routines implemented in the microprocessor to obtain, store and process the input data from the keyboard and generate control signals for triggering the triacs in a manner which provides the power pulse repetition rate required for the power setting selected and the sensed glass-ceramic temperature for each of the heating units. From these diagrams one of ordinary skill in the programming art could prepare a set of instructions for permanent storage in the ROM of microprocessor 40 which would enable the microprocessor to perform the control functions in accordance with this invention.

The control program comprises a set of predetermined control instructions stored in the read only memory (ROM) of microprocessor 40. A separate file in the random access memory (RAM) of the microprocessor is associated with each of heating units 14(a)-14(d). Each file stores the control information for its associated heating unit which is acted upon by the instructions in the ROM. Execution of the control program is synchronized with the 60 Hz power signal such that the set of control instructions in the ROM is cycled through once during each cycle of the power signal. A file register common to all four files functioning as a four count ring counter is incremented once during each pass through the control program. The count of this file register identifies the RAM file to be operated on by the control instructions during the ensuing pass through the control program. By this arrangement the control program is executed for any one particular heating unit once every four cycles of the 60 Hz power signal.

The control program is logically divided into a set of sub-routines which includes the Scan routine, the Keyboard Decode routine, the Rate Calc routine, the Rate Control routine, the Steady State routine, the PSET routine, and the Power Out routine. It will be appreciated that other sub-routines may also be included to perform control functions unrelated to the present invention.

The Scan routine (FIG. 8), which contains the file register identifying the RAM file to be acted upon during the ensuing pass through the control program, sets the scan line for the keyboard column associated with the heating unit which is the subject of the current pass through the routine, reads the input from the keyboard, and stores the user selected power setting selection information in temporary memory. The Keyboard Decode routine validates keyboard entries and updates the control variable representing the power level selected by the user as appropriate to reflect the most recent valid user input. The Rate Calc routine reads in the glass-ceramic cooktop temperature information, and periodically calculates the rate of change of temperature. This information is used in the Rate Control and Steady State Control routines which perform the temperature limiting function by making adjustments to the power level to be applied to the heating unit as a function of the glass-ceramic temperature, the rate of change of glass-ceramic temperature and the user selected power setting in accordance with the present invention.

While the determination of what power level to be applied to the surface unit is determined only during the pass through the program for that particular heating unit, a power control decision must be made for the ensuing power cycle for each of the units during each pass through the program. The PSET routine obtains power level information from each file during each pass through the routine, performs a table look-up for each heating unit to check the appropriate bit for the power level control word for each surface unit, and generates a four bit trigger control word which identifies which heating units are to be triggered on and which are to be off during the next power cycle. This four bit control word is then used by the Power Out routine which monitors the input from the zero crossing circuit and triggers those triacs associated with surface units to be energized during the next power cycle into conduction upon detection of the next occurring positive going zero crossing of the power signal. Each of these control routines will now be described in greater detail with reference to its flow diagram in the discussion to follow.

Figure 8:
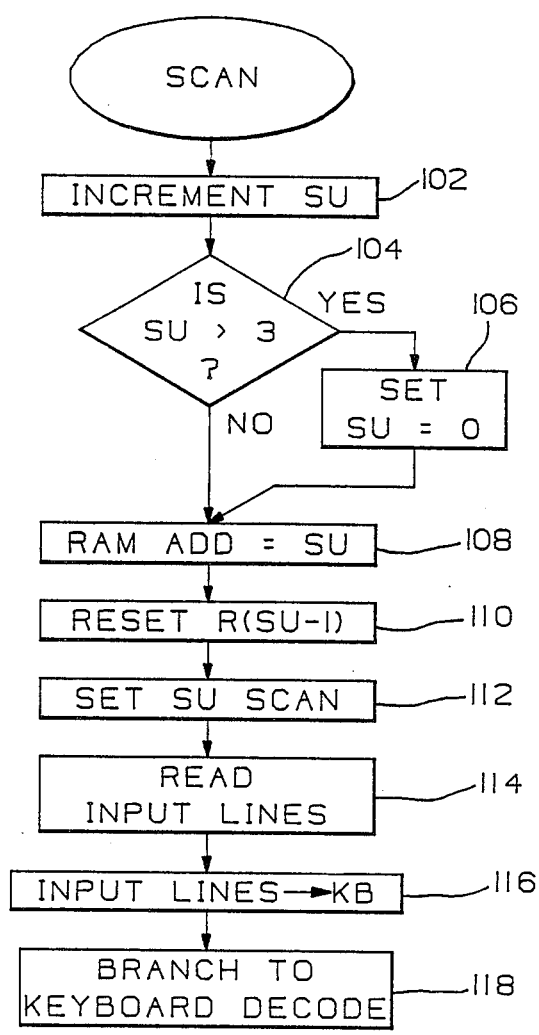
FIG. 8 is a flow diagram of the Scan routine incorporated in the control program for the microprocessor in the circuit of FIG. 7.

SCAN Routine—FIG. 8

The function of this routine is to address the appropriate RAM file for the current pass through the program, set the appropriate scan line for the keyboard, and read in the input information from the keyboard for the heating unit associated with the designated RAM file. RAM file register SU functions as a four count ring counter which counts from 0 to 3. Counts 0 through 3 of the SU counter identify RAM files for surface units 14(a)-14(d) respectively.

Upon entering the Scan routine the register SU is incremented (Block 102) and Inquiry 104 determines if SU is greater than 3. If so, the counter is reset to 0 (Block 106). Next the address of the RAM file to be acted upon during this pass through the control program is set equal to SU (Block 108). The scan line set during the previous pass through the control program designated R(SU-1) is reset (Block 110). The scan line associated with the surface unit for the current pass through the program designated R(SU) is set (Block 112). The data of input lines P1IA through 9 are read in, conveying the current input information for this RAM file from keyboard 28 (Block 114) and this information is stored as variable KB (Block 116). The program then branches (Block 118) to the Keyboard Decode routine of FIG. 9A.

Figure 9A:
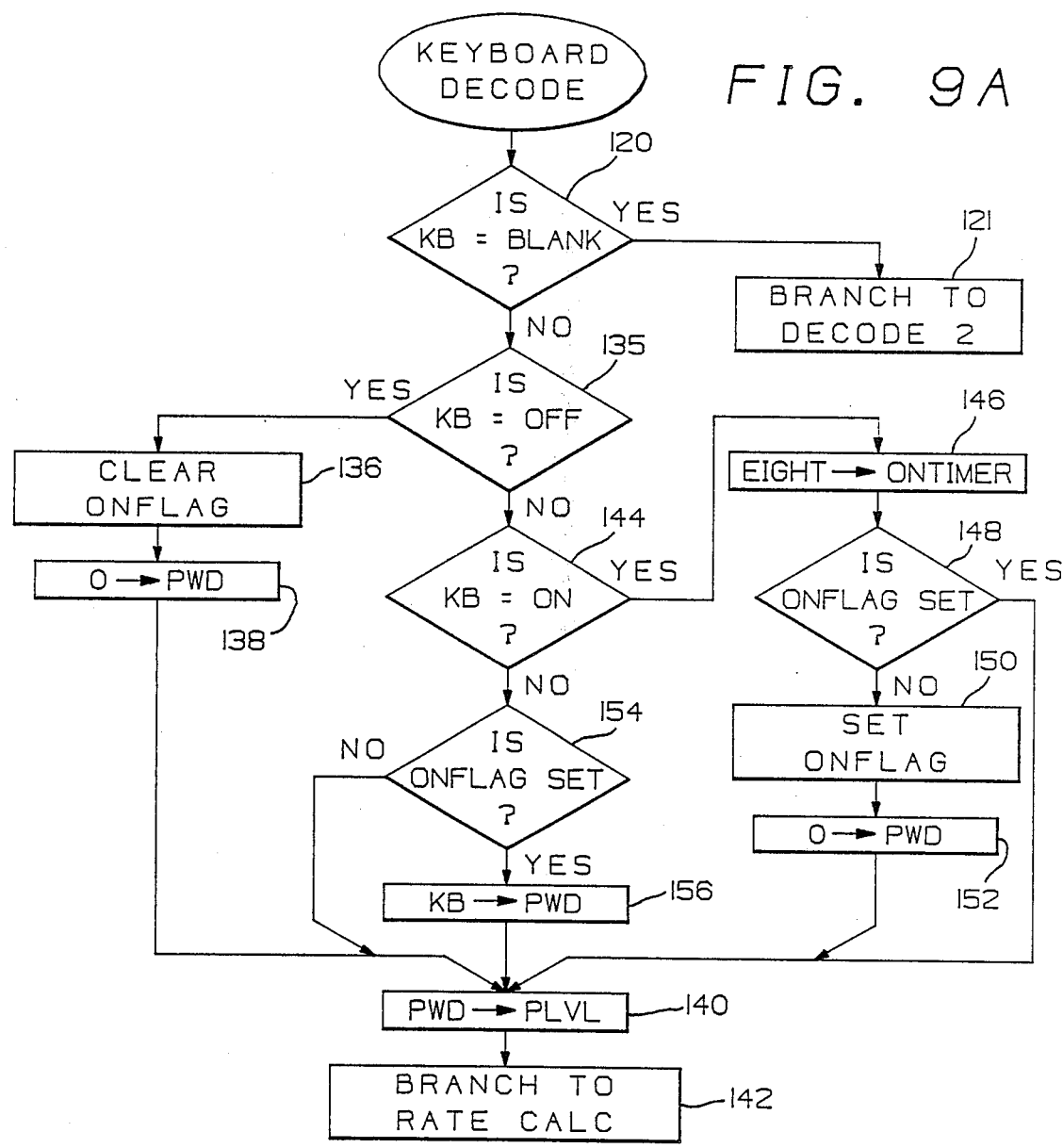

KEYBOARD DECODE Routine—FIGS. 9A and 9B

The Keyboard Decode routine validates inputs from keyboard 28 and updates the user selected power setting variable PWD accordingly. The routine first determines if the new keyboard entry is a blank signifying no input, an Off entry, an On entry, or one of the power levels 1 through 9. To be valid when switching the heating unit from Off to another power setting, the On key must be actuated first followed by the desired power setting. The power setting must be entered within 8 seconds of actuation of the On key. If not, the On key must be re-actuated.

The variable PWD represents the user selected power setting. PWD is only changed in response to user inputs. However, in accordance with the present invention the power level actually applied to the heating unit may be less than the level corresponding to the user selected power setting. The variable PLVL is introduced in this routine to represent the power level to be actually applied to the heating unit. PLVL is assigned the value of PWD in this sub-routine. However, PLVL is subject to be changed in the temperature limiting routines hereinafter described.

In the Keyboard Decode routine the eight second period for entering a valid power setting after actuation of the On key is established using a flag designated the On flag and a timer or counter designated the ON-TIMER. The On flag is set when the On key is actuated and is only reset in response to actuation of the Off key or timing out of ONTIMER.

Figure 10:
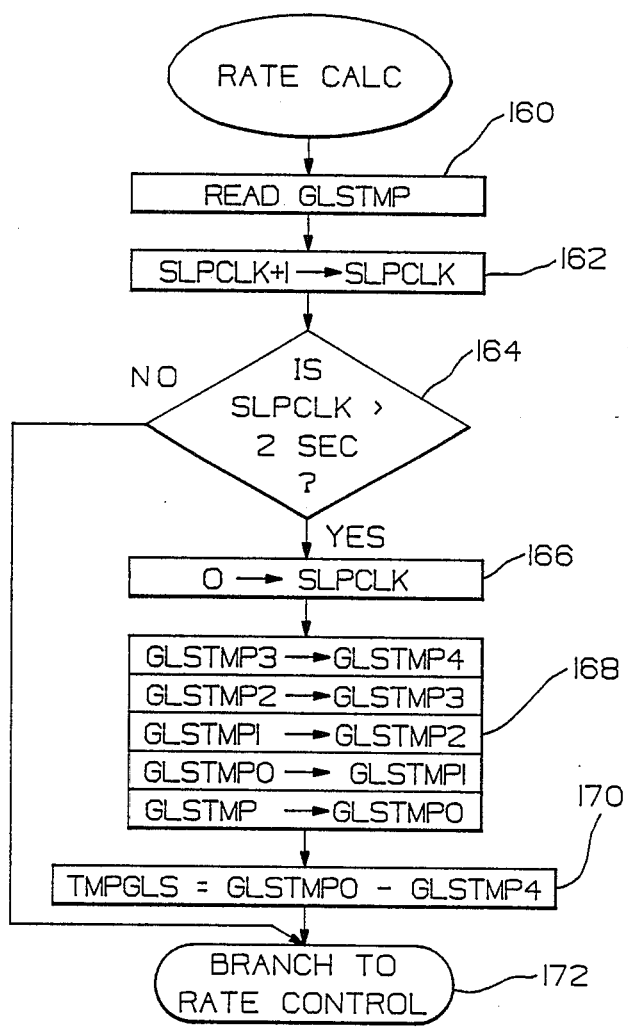
FIG. 10 is a flow diagram of the Rate Calc routine incorporated in the control program of the microprocessor in the circuit of FIG. 7.

Referring to the low diagram of FIGS. 9A and 9B, Inquiry 120 first determines if the KB represents a blank signifying that no key is presently actuated. If KB is blank, the system branches to the Decode 2 sub-routine (FIG. 9B). In the Decode 2 sub-routine Inquiry 122 determines if the On flag is set. If the On flag is not set, the power level stored in PWD is assigned to the variable PLVL (Block 124). If the On flag is set, Inquiry 126 determines if the previously selected power setting presently stored as PWD is the Off setting. If not, the system is presently operating at one of power settings 1 through 9 and the program proceeds to assign the value of PWD to PLVL (Block 124) and branches (Block 128) to the Rate Calc routine (FIG. 10). If Inquiry 126 determines that PWD equals 0 representing an Off power level, this indicates that the user has switched from Off to On and the On timer is decremented (Block 130). When On timer equals 0 as determined at Inquiry 132 signifying that the time to enter a valid power level has expired, the On flag is cleared (Block 134) and program proceeds to Block 124 as before.

Referring again to FIG. 9A, if KB is not a blank, Inquiry 135 determines if the new entry is the Off setting. If so, the On flag is cleared (Block 136) and the variable PWD is assigned the value 0 representing the Off power setting (Block 138). The variable PLVL is assigned the value of PWD (Block 140) and the program branches (Block 142) to the Rate Calc routine of FIG. 10. If KB is not Off, Inquiry 144 determines if the new entry is the On setting. If it is, the On timer is re-initialized (Block 146). Inquiry 148 checks the state of the On flag. If set, the program proceeds to Block 140. If not set, the flag is set (Block 150) and the PWD is assigned the value 0 which corresponds also to the On setting (Block 152). The program then proceeds to Block 140 as before.

If the answer to Inquiry 144 is No, signifying that the new entry is one of power levels 1 through 9, Inquiry 154 checks the state of the On flag. If it is not set, signifying the user has attempted to go from Off to a power level without first actuating the On key, the new entry is ignored and the program proceeds to Block 140 with PWD unchanged. If the On flag is set, the power setting input is valid, and variable PWD is assigned the new value corresponding to the new entry KB (Block 156).

Having assigned the value of PWD representing the most recent valid user selected power setting to the variable PLVL the system proceeds to the Rate Calc routine (FIG. 10) to determine if adjustments to the power level to be applied to the heating unit are required.

RATE CALC Routine—FIG. 10

The function of this routine is to determine the rate of change of the glass-ceramic temperature. The rate calculation is repeated every two seconds to provide a rapid control response. However, the rate of change is calculated by measuring the difference between glass-ceramic temperature measurements separated by eight seconds. This eight second separation provides a more accurate rate determination. These time intervals provide satisfactory results in the illustrative embodiment.

Referring to the flow diagram of FIG. 10, the glass-ceramic temperature input from A/D converter is read in (Block 160) and stored as the variable designated GLSTMP. A two second timer SLPCLK is incremented (Block 162). At two second intervals (Inquiry 164) the timer is reset (Block 166).

As shown at Block 168, when the rate of change is to be updated, the current value of GLSTMP is stored as GLSTMP0, the previous reading is stored as GLSTMP1; the previous GLSTMP1 is stored as GLSTMP2; the previous GLSTMP2 is stored as GLSTMP3, and the previous GLSTMP3 is stored as GLSTMP4. By storing temperature measurements every two seconds in this fashion, the time span between the most recent temperature measurement GLSTMP0 and the oldest stored temperature measurement GLSTMP4 is approximately eight seconds.

The rate of change of temperature, TMPSLP, is calculated as the difference between the most recent measurement and the oldest stored measurement (Block 170). This difference is proportional to the rate of change with a proportionality factor of $\frac{1}{8}$. After reading in the temperature data and updating the rate of change calculation as appropriate, the program branches (Block 172) to the Rate Control routine (FIG. 11).

Figure 11:
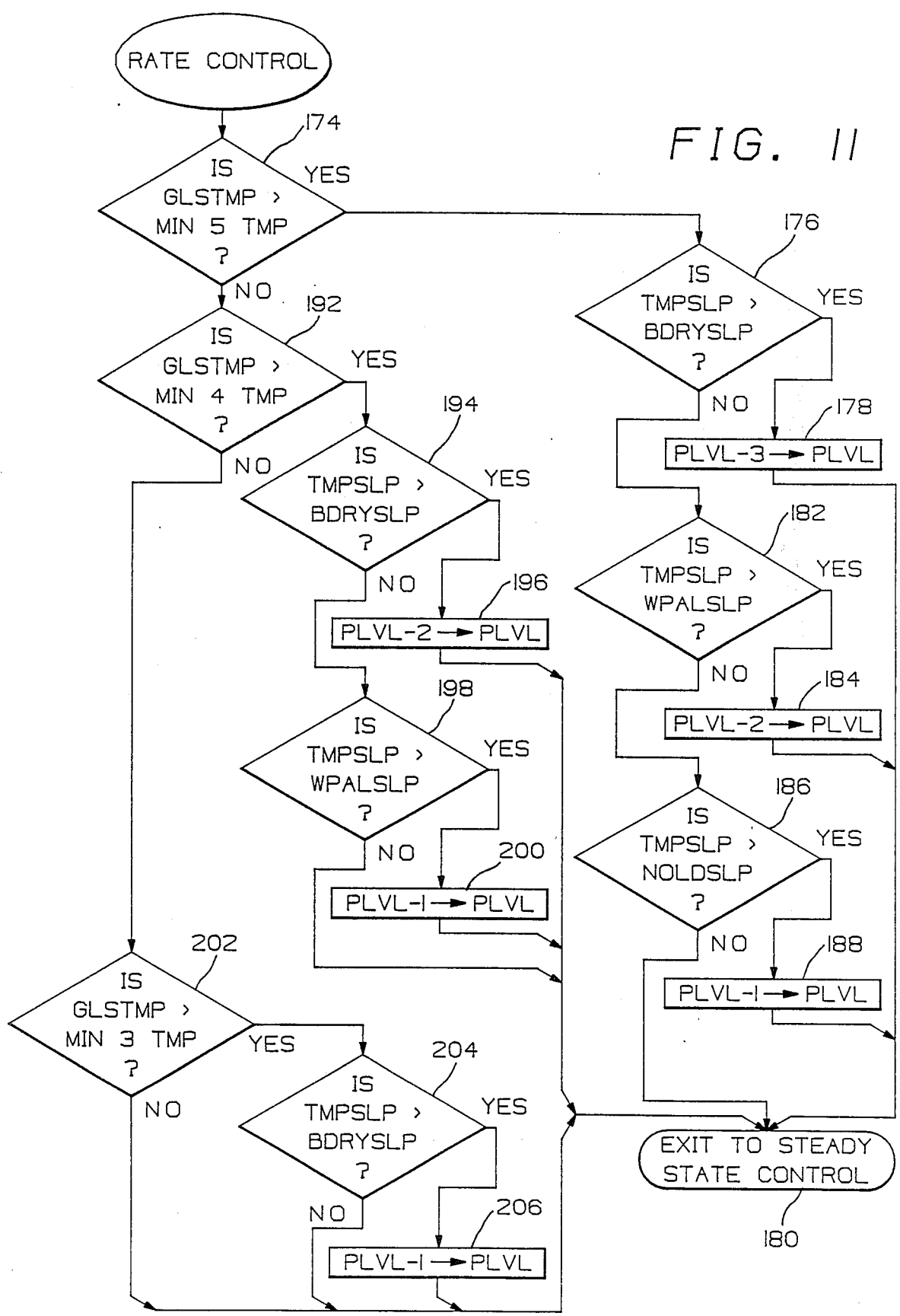
FIG. 11 is a flow diagram of the Rate Control routine incorporated in the control program of the microprocessor in the circuit of FIG. 7.

RATE CONTROL Routine—FIG. 11

The Rate Control routine performs the function of monitoring the glass-ceramic temperature and rate of change of glass-ceramic temperature to detect abnormal load conditions on the cooktop.

The glass-ceramic temperature variable GLSTMP is compared to predetermined reference temperatures and the measured rate of change variable TMPSLP is compared to predetermined reference rates to determine if an abnormal load condition is present. When an abnormal load condition is detected, PLVL is reduced as a function of the glass-ceramic temperature, the measured reference rate and the user selected power setting to protect the glass-ceramic cooktop from overheating.

The predetermined reference rate BDRYSLP, WPALSLP, and NOLDSLP represent the Boil Dry, Warped Pan and No Load conditions hereinbefore described. The values assigned to these reference rates in the illustrative eabodiment represent rates of 1.3° C./sec, 0.8° C./sec and 0.4° C./sec, respectively.

Figure 12A:
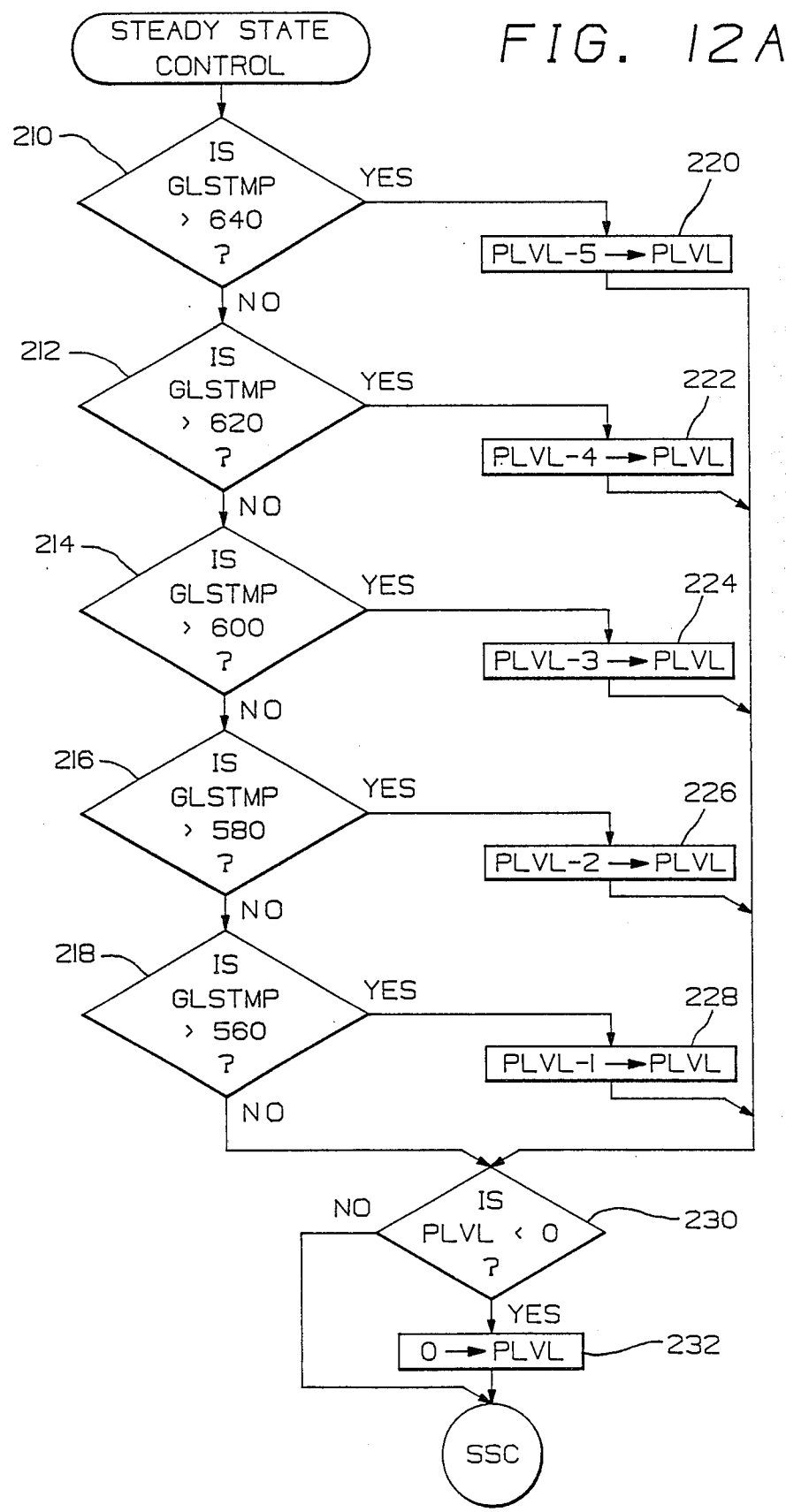
FIGS. 12A and 12B are flow diagrams for the Steady State Control routine incorporated in the control program of the microprocessor in the circuit of FIG. 7.

Referring now to the low diagram in FIG. 11, the sensed glass-ceramic temperature GLSTMP is first compared to a predetermined reference temperature identified as MIN5TMP (Inquiry 174). MIN5TMP is the maximum rate control reference temperature which in the illustrative embodiment is set at 480° C. If the temperature is greater than 480° C., the rate of change of temperature is compared to the reference rate of change corresponding to the boil dry condition (BDRYSLP) (Inquiry 176). If the measured rate of change is greater than the reference rate BDRYSLP, PLVL is reduced by 3 power levels (Block 178), and the program branches (Block 180) to the Steady State Control routine (FIG. 12A). If the answer at Inquiry 176 is No, the measured rate of change is compared to a second reference rate of change, WPALSLP, corresponding to the warped pan reference rate (Inquiry 182). If the measured rate exceeds this reference, PLVL is reduced by 2 power levels (Block 184) and the program proceeds to the Steady State Control routine. If the measured rate of change is not greater than the warped pan reference rate, the measured rate of change is compared to the reference rate of change corresponding to the no-load condition NOLDSLP (Inquiry 186). If the measured rate exceeds this no-load reference rate, PLVL is reduced by 1 power level (Block 188) and program branches to the Steady State Control routine. If the rate does not exceed the no-load reference rate, no change is made to PLVL and the program branches to the Steady State Control routine.

Referring back to Inquiry 174, if the glass-ceramic cooktop temperature is not greater than the maximum reference of 480 °C., the glass-ceramic temperature is compared to an intermediate reference temperature MIN4TMP (Inquiry 192) which in the illustrative eabodiment is set at 440° C. If the temperature is above this reference, the measured rate of change of temperature is again compared to the maximum reference rate corresponding to a boil dry condition (Inquiry 176). However, this time if the measured rate exceeds the reference rate, PLVL is reduced by 2 (Block 196) and the program branches to the Steady State Control routine. If the measured reference rate is not greater than the boil dry reference rate, the measured rate is compared to the warped pan reference rate (Inquiry 198). If the rate exceeds the warped pan reference rate, PLVL is reduced by 1 (Block 200) and the program branches to the Steady State Control routine. If the measured rate of change is not greater than the warped pan rate of change, no further adjustment is made to PLVL and the program branches to a Steady State Control routine.

If the glass-ceramic temperature is not greater than the intermediate reference rate, the temperature is compared to a minimum reference rate MIN3TMP (Inquiry 202). In the illustrative embodiment this MIN3TMP is set at 400° C. If the temperature is less than the intermediate reference temperature but greater than this minimum reference temperature, the measured rate of change of temperature is compared only to the maximum rate of change reference (Inquiry 202). If the measured rate exceeds the reference, PLVL is reduced by 1 (Block 206) and the program proceeds to the Steady State Control routine. If the referenced temperature is less than the minimum reference or if the measured rate is less than the maximum reference rate, no adjustment is made in this routine to PLVL and the program branches to the Steady State Control routine.

Figure 12B:
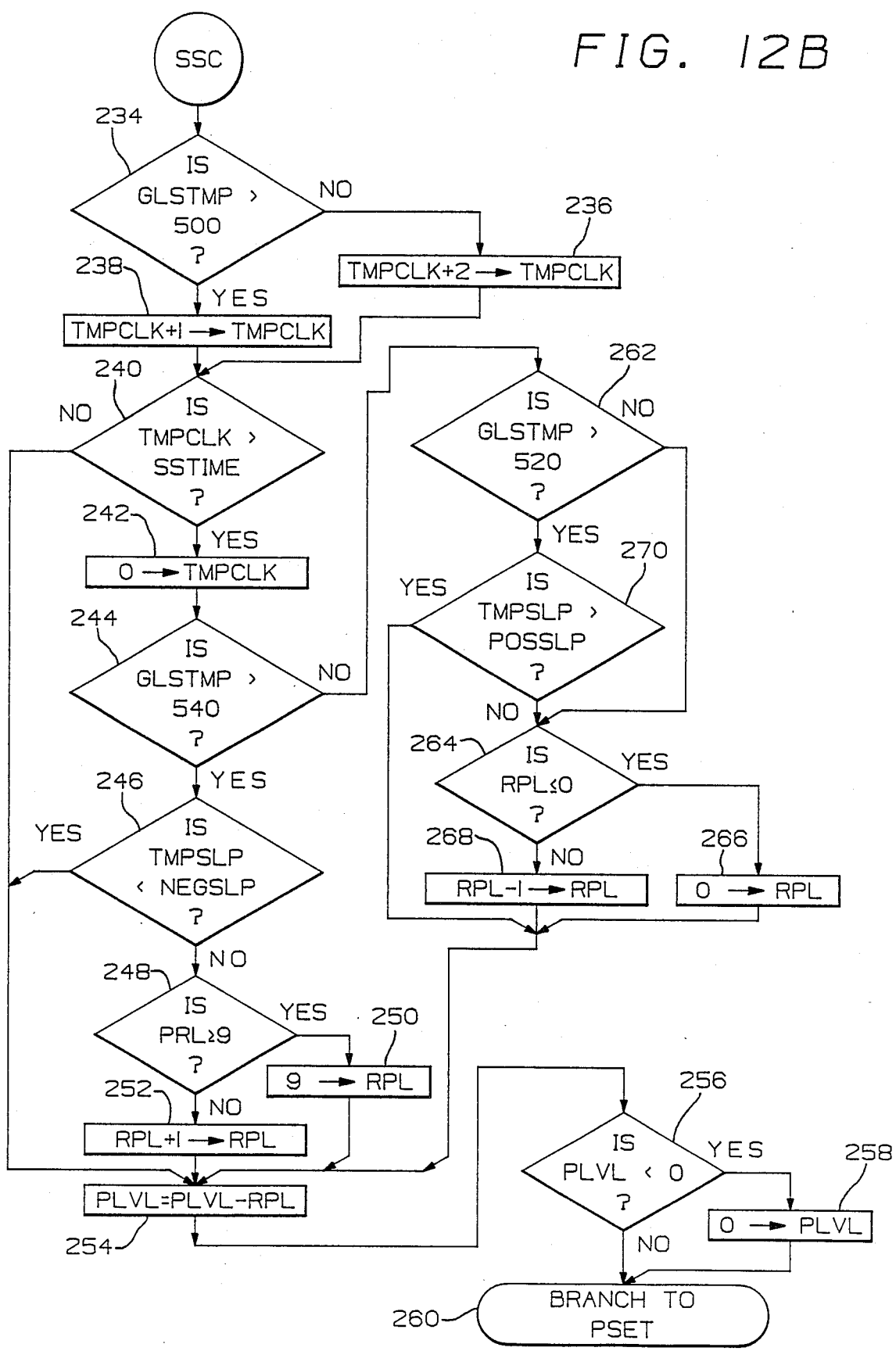

STEADY STATE CONTROL Routine—FIGS. 12A and 12B

The Steady State Control routine has two parts. The function of the first part is to limit increase in the temperature by comparing the sensed glass-ceramic temperature to five successively higher predetermined reference temperatures and reducing the power level applied to the heating unit by one level for each reference that is exceeded. The function of the second part is to establish a quiescent operating point for the heating unit at which the glass-ceramic temperature is constrained within a predetermined maximum temperature band, while operating the heating unit at the highest power level not greater than the selected level which is consistent with this temperature band limitation whenever the thermal load on the glass-ceramic is such that the glass-ceramic temperature would be driven excessively higher when the unit is operated at the user selected power setting. For the illustrative embodiment this maximum acceptable temperature band is 520°–540° C.

Referring first to FIG. 12A, in the first part of this routine, Inquiries 210–218 compare the measured glass-ceramic temperature to reference temperatures of 640° C., 620° C., 600° C., 580° C., and 560° C. respectively. If the measured temperature exceeds the reference temperature, PLVL is reduced by 5, 4, 3, 2 and 1 levels respectively at Blocks 222–230 respectively. Inquiry 230 and Block 232 cooperate to make sure that PLVL is not lowered below 0. The control program then continues to the second part of the Steady State Control routine illustrated in FIG. 12.

In the second part of this routine, when the temperature is above 540° C., the rate of change of the temperature is periodically determined and compared to a negative reference rate of change to determine if the temperature is decreasing at a sufficient rate to bring it within an acceptable limits within acceptable time period. When the measured rate of change is more negative than the reference rate signifying that the temperature is indeed decreasing at a satisfactory rate, no further decrease in the power setting is required. If the rate is less negative signifying that the temperature is not decreasing at a satisfactory rate, the power level is reduced an additional level.

Once the temperature is less than 540° C. in order to keep the power level applied to the unit as high as possible, a check is made to see if the temperature is within the band of 520°-540° C. If the temperature is less than 520° C., the power level is increased by one power level. If the temperature is above 520° C. but less than 540° C., then the rate of change is compared to a positive rate of change to determine if the temperature is increasing. If the temperature is increasing at a rate greater than the reference rate, no change is made to the power level. If not, the power level is increased by one power level. By this arrangement a quiescent operating point is reached at which the surface unit is operated at the maximum power level less than the user selected power level consistent with maintaining the glass-ceramic temperature within the 520°-540° C. range.

In making the rate of change comparisons in this routine the time interval between successive comparisons is established by a clock designated TMPCLK. This clock is incremented at one rate when the temperature of the glass-ceramic is above 500° C. and at a second faster rate when the temperature is below 500° C. In this way when the temperature is below 500° C. the adjustments to power settings are made more often so as to quickly bring the heating unit back up to the maximum acceptable power level.

Referring now to the flow diagram of FIG. 12B, Inquiry 234 compares the glass-ceramic temperature to the 500° C. reference to determine at which rate to increment the timer TMPCLK. If the temperature is less than 500° C., TMPCLK is incremented by 2 (Block 236). If it is less than 500° C., TMPCLK is incremented by 1 (Block 238). The desired intervals in the illustrative embodiment are set at 6 seconds when the temperature is greater than 500° C. and 3 seconds when the temperature is less than 500° C.. Inquiry 240 determines when TMPCLK has timed out by comparing TMPCLK to the variable SSTIME representing the maximum time interval.

When the TMPCLK times out, it is reset (Block 242) and the glass-ceramic temperature is compared to a 540° C. reference temperature (Inquiry 244). If the temperature is greater than 540° C., the rate of change of temperature is compared to the negative reference rate designated NEGSLP (Inquiry 246). If the measured slope is less negative than the reference rate signifying the glass-ceramic is not cooling down quickly enough, an adjustment is made to a variable RPL.

RPL represents the cumulative adjustment to the power level called for by this portion of the Steady State Control routine. RPL is ultimately subtracted from the variable PLVL, representing the power level to be applied to the heating unit. Thus, to decrease the power level applied to the heating unit by 1, RPL is increased by 1. Similarly, to increase the power level by 1, RPL is decreased by 1. RPL is never allowed to be greater than 9 because a power level PLVL less than 0 is undefined.

Referring again to Inquiry 248, when the measured rate is less negative than the reference rate, PLVL is to be reduced. Inquiry 248 determines if RPL is greater than 9. If so, it is set equal to 9. If not, it is increased by 1 (Blocks 250 and 252 respectively). PLVL is then reduced by the value of RPL at Block 254. Inquiry 256 determines if PLVL is less than 0. If so, it is set equal to 0. Then the program (Block 258) branches to the PSET routine of FIG. 13.

Referring back to Inquiry 244, if the glass-ceramic temperature is not greater than 540° C., Inquiry 262 determines if the temperature is greater than 520° C. If not, it is desirable to increase the power level applied to the heating unit. Inquiry 264 determines if RPL is less than or equal to 0. If it is, it is set equal to 0 (Block 266). If not, RPL is reduced by 1 (Block 268) and PLVL is set equal to PLVL minus RPL at Block 254. Thus, when the temperature of the glass-ceramic is less than 520° C. the power level applied to the heating unit is adjusted upward by 1 so as to move the applied power level back toward the power level corresponding to the user selected power setting. If the temperature is greater than 520° C., Inquiry 270 compares the rate of change of the temperature to a predetermined reference rate of change POSSLP which in the illustrative eabodiment represents to a positive 0.1° C. per second. If Inquiry 270 indicates the rate is increasing, signifying the temperature is moving from 520° C. towards 540° C., no adjustment to RPL is made and the program proceeds to Block 254. If the temperature is not increasing at a rate greater than the reference rate, program proceeds to Inquiry 264 where the appropriate adjustment to reduce RPL is made via Inquiry 264, and Blocks 266 or 268. The program next proceeds to Block 254 as previously described.

PSET Routine—FIG. 13

Having established the appropriate power level to be applied to the heating unit, it remains to make the triac triggering decision for the next occurring power signal cycle. This decision is made for each of the four heating units during each pass through the control program. Use is made in this routine of information from each of the four heating unit RAM files each time through the routine. It will be recalled that the power pulse repetition rate for each power level is defined by the bit pattern of a 64-bit word with the logical one bit representing an On cycle and logical zero representing an Off cycle. The bits of the word representing the power level to be applied to the heating unit are tested sequentially with one bit being tested each pass through this routine. The state of that tested bit determines whether the triac for the corresponding heating unit will be triggered on or not in the next power signal cycle.

This routine performs a Table Look-Up function to find the appropriate control word and then checks the state of the appropriate bit in that word for each of the four surface units. The triac triggering information is then stored in a four-bit word designated TMPON, which is used in the Power Out routine (FIG. 14) to generate the appropriate triac trigger signals.

The variable TBLADD represents the address in RAM of the starting location for the look-up table containing the 64-bit control words. The address and associated bit pattern in Hex representation is shown in Table I. Each of the 16 digits in the code as shown for each control word is the hexidecimal representation of four binary bits.

The variable designated BITADD represents the location within the 64 bit control word of the bit to be tested with 0 and 63 corresponding to the location of the most significant bit and least significant bit respectively.

An indexing variable n is used to iterate the table look-up loop four times during each pass through the routine, once for each heating unit. The variable PWDADD is the address of the control word representing the power level to be applied to the $n^{th}$ heating unit. As can be seen in Table I, the address for any particular power word is obtained by multiplying the value of PLVL for its associated power level, which is a number 0 through 9, multiplied by a factor of 8 and adding this to TBLADD.

Referring to FIG. 13, on entering this routine the control word TMPON is cleared (Block 272) and a ring counter which counts from 0 to 63 is incremented. Inquiry 276 determines if the counter is greater than its maximum count of 63. If so, it is reset to 0 (Block 278). Next BITADD is set equal to the count of the ring counter thereby defining the location within the control word for the bit to be tested for each heating unit (Block 280). The same bit location is tested for each of the 5 heating units.

Figure 14:
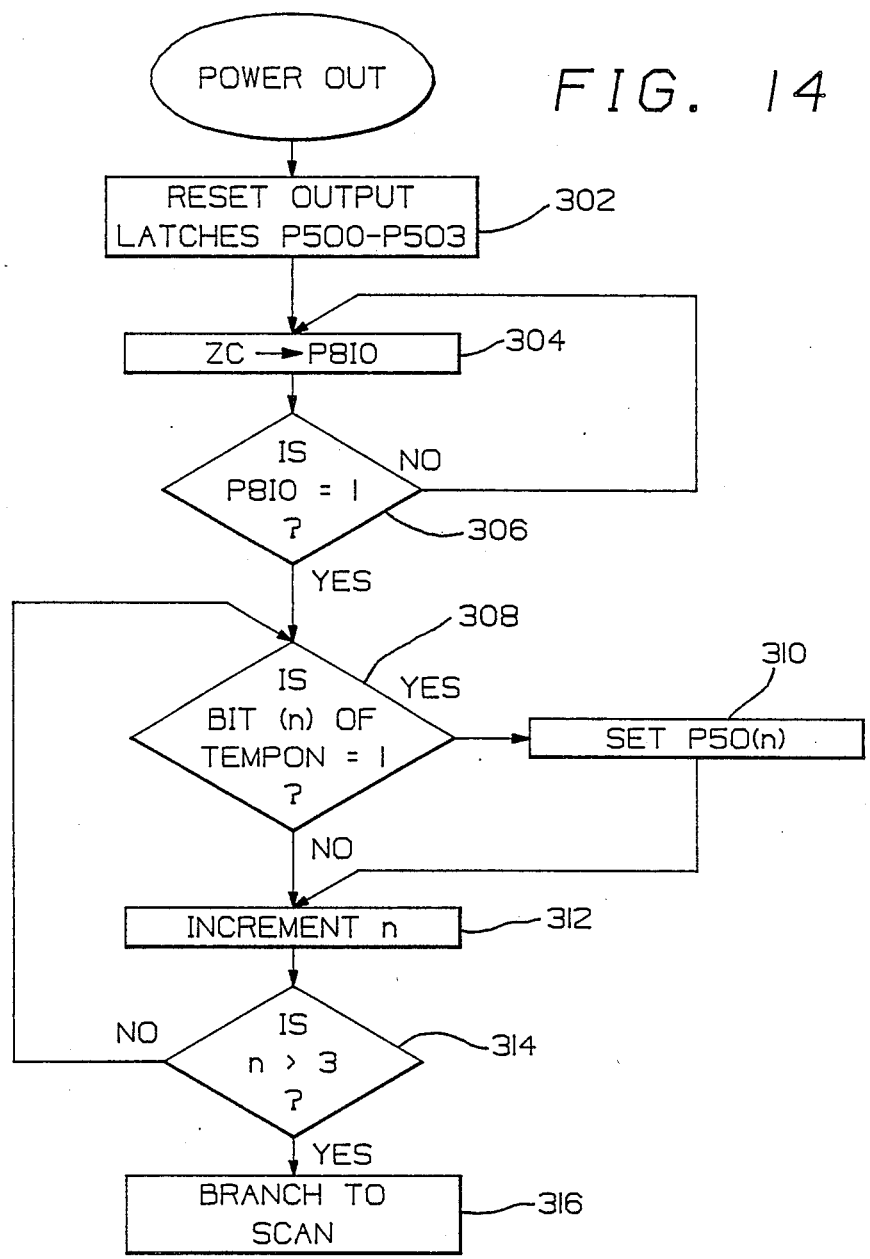
FIG. 14 is a flow diagram of the Power Out routine incorporated in the control program of the microprocessor in the circuit of FIG. 7.

The variable n is initialized to zero at Block 282. PWDADD for the power level to be applied to the $n^{th}$ heating unit is determined at Block 284. The state of the bit location defined by the variable BITADD in the control word located at the address PWDADD is then tested (Inquiry 286). If the tested bit is a logical 1, the $n^{th}$ bit of the control word TMPON is set (Block 288). Otherwise, the $n^{th}$ bit of TMPON will remain 0. After the index n is incremented (Block 290) the value of n is checked (Inquiry 292). If greater than 3, signifying that the loop comprising Blocks 284, 288 and 290 and Inquiries 284 and 286 has been iterated four times, n is reset (Block 294) and the program proceeds to the Power Out routine (FIG. 14). If n is not greater than 3 the program returns to Block 284 to test the bit for the power word for the next heating unit. After the appropriate state for all four bits of the variable TMPON have been established, the program branches (Block 296) to the Power Out routine (FIG. 14).

POWER OUT Routine—FIG. 14

The function of this routine is to trigger triacs 24(a)-24(d) to implement the triac triggering decision for the next power cycle for each of the four heating units. The triggering of the triacs is synchronized with the positive going zero crossings of the power signal.

Referring now to the routine in FIG. 14, on entering this routine the output latches P500-P503, which control the triacs, are reset (Block 302). Next the program reads in the input from the input port P8IO representing the state of the zero cross detector (Block 304) and Inquiry 306 checks the state of this input until it switches to a logical 1 signifying the occurrence of a positive going zero crossing of the power signal. When P8IO equals 1, the program proceeds to Inquiry 308 to sequentially check the four bits of the power word TMPON and set the appropriate one of output latches P500-P503. Index variable n is again used to sequentially check bits 0 through 3. It will be recalled that prior to branching from the PSET routine the n is reset to 0. Inquiry 308 tests the $n^{th}$ bit for a 1. If it is a 1 the output P50(n) is set (Block 310), n is incremented (Block 312) and Inquiry 314 checks for an n greater than 3. If n is less than 3, the program returns to Inquiry 308 to check the next bit and set the corresponding output port as appropriate. Those ones of output latches P500-P503 associated with bits in the variable TMPON which are in the logical one state are set. Those ones with output latches associated with zero bits in TMPON are not set. In the latter case these latches remain in the reset state since each of the latches is reset upon entering this routine.

In this fashion each bit of the control word TMPON is tested each pass through the Power Out routine. In this way a decision to trigger or not trigger each triac is carried out during each pass through the control program. Once the loop comprising Inquiries 306 and 312 and Blocks 308 and 310 is iterated four times, once for each heating unit, the power control decision for the next power cycle has been implemented and the program returns to the Scan routine to execute the program for the next heating unit.

While in accordance with the Patent Statutes a specific embodiment of the present invention has been illustrated and described herein, it is realized that numerous modifications and changes will occur to those skilled in the art. For example, the illustrative embodiment employs infrared heating units. However, the invention could also be used in conventional conduction cooktops as well. It is therefore to be understood that the appended claims are intended to cover all such modifications and changes as fall within the true spirit and scope of the invention.

What is claimed is:

1. In a household cooking appliance of the type having a glass-ceramic cooking surface for supporting loads to be heated, at least one radiant heating unit disposed beneath the glass-ceramic cooking surface to heat loads supported thereon, and user actuable input selection means for enabling the user to select one of a plurality of power settings for the heating unit; a power control system comprising:

temperature sensing means for sensing the temperature of the glass-ceramic support surface proximate the heating unit; and power control means responsive to the input selection means and said temperature sensing means, and operative to operate the heating unit at a steady state power level corresponding to the user selected power setting;

said power control means including means for determining the rate of change of the sensed glass-ceramic temperature, and means for monitoring the glass-ceramic temperature and the temperature rate of change to detect an abnormal thermal load condition on the glass-ceramic cooking surface;

said power control means being operative in response to detection of an abnormal load condition to operate the heating unit at a power level lower than the steady state power level associated with the user selected power setting, said lower level being determined as a function of the sensed glass-ceramic temperature, the temperature rate of change, and the user selected power setting, to limit the temperature of glass-ceramic cooking surface so as to avoid damage by excessive temperatures resulting from abnormal thermal load conditions on the cooking surface.

2. The power control system of claim 1 wherein said means for monitoring the glass-ceramic temperature and the temperature rate of change to detect an abnormal load condition comprises means for comparing the sensed glass-ceramic temperature to a predetermined threshold reference temperature and means for comparing the measured temperature rate of change to a predetermined reference rate of change representing an abnormal load condition on the glass-ceramic cooking surface for the heating unit, said monitoring means detecting an abnormal load condition when the sensed temperature exceeds the reference temperature and the measured temperature rate of change exceeds the reference rate of change.

3. The power control system of claim 1 wherein said means for monitoring the glass-ceramic temperature and the rate of change to detect an abnormal load condition comprises means for comparing said sensed temperature to a first threshold reference temperature, a second threshold reference temperature higher than said first reference temperature, and a third reference temperature higher than said second reference temperature and means for comparing the measured rate of change temperature to a first reference rate of change representative of a first abnormal load condition, a second predetermined reference rate of change less than said first rate of change representing a second abnormal load condition and a third reference rate of change less than said second rate of change representing a third abnormal load condition, said monitoring means detecting an abnormal load condition when said sensed temperature is greater than said first reference temperature and said measured rate of change exceeds said first reference rate of change or when said measured glass-ceramic temperature exceeds said second reference temperature and said measured rate of change exceeds either said first reference rate of change or said second reference rate of change or when said sensed utensil temperature exceeds said third reference temperature and said measured rate of change exceeds said first reference rate, said second reference rate or said third reference rate.

4. The power control system of claim 3 wherein said power control means is operative to reduce the power level applied to the surface unit by a first amount when said sensed temperature exceeds said first reference and said measured rate of change exceeds said first reference rate of change or when said sensed temperature exceeds said second reference and said measured rate of change exceeds said second reference rate, or when said sensed temperature exceeds said third reference rate and said measured rate of change exceeds said third reference rate of change, and to reduce the power level by a second amount greater than said first amount when said sensed temperature exceeds said second reference temperature and said measured rate exceeds said first reference rate or when said measured temperature exceeds said third reference temperature and the measured rate exceeds said second reference rate and to reduce the power level applied to the heating unit by a third amount greater than said second amount when said sensed temperature exceeds said third reference temperature and said measured rate exceeds said first reference rate.

5. Power control system of claim 4 wherein said first abnormal load condition corresponds to a boil dry condition, said second abnormal load condition corresponds to a warped pan condition, and said third abnormal condition corresponds to a no load condition.

6. Power control system of claim 3 wherein said first abnormal load condition corresponds to a boil dry condition, said second abnormal load condition corresponds to a warped pan condition, and said third abnormal condition corresponds to a no load condition.

7. Power control system of claim 1 wherein said means for monitoring said sensed temperature and said rate of change of said sensed temperature to detect an abnormal load condition comprises means for comparing the sensed glass-ceramic temperature to a first predetermined reference temperature representative of an abnoraally high temperature condition and means for comparing the rate of change to a predetermined negative reference rate of change, said abnormal load condition being detected when said sensed temperature exceeds said reference temperature and said measured rate of change is less negative than said reference rate of change, whereby said power control arrangement operates the heating unit at successively lower power levels until the abnormal operating condition is corrected as signified by a glass-ceramic temperature less than said reference or a measured rate of change of glass-ceramic temperature more negative than said reference rate.

8. The power control arrangement of claim 7 wherein said power control means is further operative following the reduction of the power level applied to the heating unit to a level lower than the steady state level in response to the detection of an abnormal load condition after such a condition ceases to be detected, to gradually increase the power level applied to the heating unit until the applied power level again equals the steady state power level or until detection of an abnormal load condition recurs.

9. The control system of claim 8 wherein the means for measuring the temperature rate of change comprises timing means for establishing the time interval between successive rate of change measurements; said timing means establishing a first time interval when the measured glass-ceramic temperature is above a second predetermined reference temperature lower than said first reference temperature representing the maximum desired steady state temperature for the glass-ceramic cooking surface and establishing a second time interval shorter than said first time interval when the sensed temperature is less than said second reference temperature.

10. The power control arrangement of claim 9 further comprising means for comparing the sensed glass-ceramic temperature to a third reference temperature higher than said second reference temperature, and wherein said power control means is operative to further lower the power level applied to the heating unit strictly as a function of the sensed glass-ceramic temperature, when the sensed glass-ceramic temperature exceeds said third reference temperature, to provide a quick response to excessive glass-cei .mic temperature conditions.

11. In a household cooking appliance of the type having a ceramic glass-ceramic cooking surface for supporting loads to be heated, and at least one radiant heating unit disposed beneath the glass-ceramic cooking surface to heat loads supported thereon, a power control system comprising:

user actuable input selection means for enabling the user to select one of a plurality of power settings for the heating unit;

temperature sensing means for sensing the temperature of the glass-ceramic support surface proximate the heating unit., and power control means responsive to said input selection means and said temperature sensing means, and operative to operate the heating unit at a steady state power level corresponding to the user selected power setting;

said power control means including means for comparing the sensed glass-ceramic temperature to a first predetermined reference temperature, means for measuring the rate of change of the sensed glass-ceramic temperature;

means for comparing the rate of change of the sensed glass-ceramic temperature to a positive reference rate of change representative of an abnormal load condition on the glass-ceramic cooking surface, means for comparing the measured glass-ceramic temperature to a second reference temperature higher than said first reference temperature, representative of an undesirably high glass-ceramic temperature and means for comparing the measured rate of change to a negative reference rate of change when the sensed temperature exceeds said second reference value;

said power control means being operative to operate the heating unit at a power level lower than the steady state power level associated with the user selected power setting when said sensed temperature is greater than said first reference temperature and said positive reference rate of change, or when said sensed temperature is greater than said second reference temperature and the measured rate is less negative than the negative reference rate of change, the lower power level being determined as a function of the sensed glass-ceramic temperature, the measured rate of change and the user selected power setting;

whereby as the glass-ceramic is heating up, the power is lowered when the temperature rate of change indicates the existence of an abnormal load condition characterized by an undesirably rapid increase in temperature, and the power level applied to the heating unit is also lowered if the temperature of the glass-ceramic is at an undesirably high temperature and is not decreasing at a satisfactory rate.

12. The control system of claim 11 wherein the means for measuring the slope comprises timing means for establishing the time interval between successive comparisons of the rate of change to the negative reference rate, said timing means establishing a first time interval when the measured glass-ceramic temperature is above a third predetermined reference temperature lower than said second reference temperature representing the maximum acceptable steady state temperature for the glass-ceramic cooking surface and establishing a second time interval shorter than said first time interval when the sensed temperature is less than said second reference temperature whereby the rate of decrease is measured more often when the sensed glass-ceramic temperature is below the third reference temperature to enable the power level to be increased toward the steady state level quickly in the event the power level had been reduced more than necessary to compensate for an abnormal load condition.

13. The power control arrangement of claim 12 further comprising means for comparing the sensed glass-ceramic temperature to a fourth reference temperature higher than said second reference temperature, and wherein said power control means is operative to further lower the power level applied to the heating unit strictly as a function of the sensed glass-ceramic temperature when the sensed glass-ceramic temperature exceeds said fourth reference temperature.

14. An electronic controller for a household cooking appliance of the type having a glass-ceramic cooking surface for supporting loads to be heated, and at least one radiant heating unit disposed beneath the glass-ceramic cooking surface to heat loads supported thereon, user actuable input selection means for enabling the user to select one of a plurality of power settings for the heating unit, and temperature sensing means for sensing the temperature of the glass-ceramic support surface proximate the heating unit, said electronic controller comprising:

power control means responsive to the input selection means and the temperature sensing means, operative to apply a steady state power level corresponding to the user selected power setting to the heating unit;

means for determining the rate of change of the sensed glass-ceramic temperature; and means for monitoring the glass-ceramic temperature and the temperature rate of change to detect an abnormal thermal load condition on the glass-ceramic cooking surface;

said power control means being further operative in response to detection of an abnormal load condition to operate the heating unit at a power level lower than the steady state power level associated with the user selected power setting, said lower level being determined as a function of the sensed glass-ceramic temperature, the temperature rate of change, and the user selected power setting, to limit the temperature of glass-ceramic cooking surface so as to avoid damage by excessive temperatures resulting from abnormal thermal load conditions on the cooking surface.

15. The power control system of claim 14 wherein said means for monitoring the glass-ceramic temperature and the temperature rate of change to detect an abnormal load condition comprises means for comparing the sensed glass-ceramic temperature to a predetermined threshold reference temperature and means for comparing the measured temperature rate of change to a predetermined reference rate of change representing an abnormal load condition on the glass-ceramic cooking surface for the heating unit, said monitoring means detecting an abnormal load condition when the sensed temperature exceeds the reference temperature and the measured temperature rate of change exceeds the reference rate of change.

16. The power control system of claim 14 wherein said means for monitoring the glass-ceramic temperature and the rate of change to detect an abnormal load condition comprises means for comparing said sensed temperature to a first threshold reference temperature, a second threshold reference temperature higher than said first reference temperature, and a third reference temperature higher than said second reference temperature and means for comparing the measured rate of change temperature to a first reference rate of change representative of a first abnormal load condition, a second predetermined reference rate of change less than said first rate of change representing a second abnormal load condition and a third reference rate of change less than said second rate of change representing a third abnormal load condition, said monitoring means detecting an abnormal load condition when said sensed temperature is greater than said first reference temperature and said measured rate of change exceeds said first reference rate of change or when said measured glass-ceramic temperature exceeds said second reference temperature and said measured rate of change exceeds either said first reference rate of change or said second reference rate of change or when said sensed utensil temperature exceeds said third reference temperature and said measured rate of change exceeds said first reference rate, said second reference rate or said third reference rate.

17. The power control system of claim 16 wherein said power control means is operative to reduce the power level applied to the surface unit by a first amount when said sensed temperature exceeds said first reference and said measured rate of change exceeds said first reference rate of change or when said sensed temperature exceeds said second reference and said measured rate of change exceeds said second reference rate, or when said sensed temperature exceeds said third reference rate and said measured rate of change exceeds said third reference rate of change, and to reduce the power level by a second amount greater than said first amount when said sensed temperature exceeds said second reference temperature and said measured rate exceeds said first reference rate or when said measured temperature exceeds said third reference temperature and the measured rate exceeds said second reference rate and to reduce the power level applied to the heating unit by a third amount greater than said second amount when said sensed temperature exceeds said third reference temperature and said reference rate exceeds said first reference rate.

18. Power control system of claim 14 wherein said means for monitoring said sensed temperature and said rate of change of said sensed temperature to detect an abnormal load condition comprises means for comparing the sensed glass-ceramic temperature to a first predetermined reference temperature representative of an abnormally high temperature condition and means for comparing the rate of change to a predetermined negative reference rate of change, said abnormal load condition being detected when said sensed temperature exceeds said reference temperature and said measured rate of change is less negative than said reference rate of change,
- whereby said power control arrangement operates the heating unit at successively lower power levels until the abnormal operating condition is corrected as signified by a glass-ceramic temperature less than said reference or a measured rate of change of glass-ceramic temperature more negative than said reference rate.

19. The power control arrangement of claim 18 wherein said power control means is further operative following the reduction of the power level applied to the heating unit to a level lower than the steady state level in response to the detection of an abnormal load condition after such a condition ceases to be detected, to gradually increase the power level applied to the heating unit until the applied power level again equals the steady state power level or until detection of an abnormal load condition recurs.

20. The control system of claim 19 wherein the means for measuring the temperature rate of change comprises timing means for establishing the time interval between successive rate of change measurements; said timing means establishing a first time interval when the measured glass-ceramic temperature is above a second predetermined reference temperature lower than said first reference temperature representing the maximum desired steady state temperature for the glass-ceramic cooking surface and establishing a second time interval shorter than said first time interval when the sensed temperature is less than said second reference temperature.

21. The power control arrangement of claim 20 further comprising means for comparing the sensed glass-ceramic temperature to a third reference temperature higher than said second reference temperature, and wherein said power control means is operative to further lower the power level applied to the heating unit strictly as a function of the sensed glass-ceramic temperature, when the sensed glass-ceramic temperature exceeds said third reference temperature, to provide a quick response to excessive glass-ceramic temperature conditions.

22. A method of controlling power in a cooking appliance of the type having a radiant heating unit disposed beneath a glass-ceramic cooking surface with means for sensing the temperature of the glass-ceramic cooking surface proximate the heating unit, user actuable input selection means for enabling the user to select from a plurality of power settings for the heating unit, said power control method comprising the steps of:
- operating the electric heating unit at a steady state power level corresponding to the user selected power setting;
- periodically measuring the glass-ceramic cooking surface temperature and comparing the measured temperature to a threshold reference temperature;
- when the measured temperature is above the threshold temperature, periodically computing the rate of change of the measured temperature and comparing the computed rate to a reference rate representing an abnormal load condition on the cooking surface., and
- when the measured rate is greater than the reference rate, reducing the power level applied to the heating unit as a function of the measured glass-ceramic temperature, the measured rate of change of the glass-ceramic temperature, and the user selected power setting to protect the glass-ceramic cooking surface from excessive temperatures.

* * * * *